US009100291B2

United States Patent
Ruddick et al.

(10) Patent No.: US 9,100,291 B2
(45) Date of Patent: Aug. 4, 2015

(54) SYSTEMS AND METHODS FOR EXTRACTING STRUCTURED APPLICATION DATA FROM A COMMUNICATIONS LINK

(71) Applicant: DB Networks, Inc., Poway, CA (US)

(72) Inventors: Timothy W. Ruddick, Oceanside, CA (US); Eric Varsanyi, Plymouth, MN (US); Charles A. Paterson, New Harmony, UT (US); David A. Rosenberg, Los Altos, CA (US)

(73) Assignee: DB Networks, Inc., Poway, CA (US)

( * ) Notice: Subject to any disclaimer, the term of this patent is extended or adjusted under 35 U.S.C. 154(b) by 422 days.

(21) Appl. No.: 13/750,579

(22) Filed: Jan. 25, 2013

(65) Prior Publication Data
US 2013/0194949 A1 Aug. 1, 2013

Related U.S. Application Data

(60) Provisional application No. 61/593,075, filed on Jan. 31, 2012.

(51) Int. Cl.
*H04L 12/26* (2006.01)

(52) U.S. Cl.
CPC ............ *H04L 43/065* (2013.01); *H04L 43/028* (2013.01); *H04L 43/12* (2013.01)

(58) Field of Classification Search
CPC ..... H04L 43/028; H04L 43/065; H04L 43/12; H04L 12/26
See application file for complete search history.

(56) References Cited

U.S. PATENT DOCUMENTS

| | | | |
|---|---|---|---|
| 5,768,578 A * | 6/1998 | Kirk et al. | 1/1 |
| 7,154,855 B2 | 12/2006 | Hardy | |
| 7,522,605 B2 | 4/2009 | Spencer et al. | |
| 7,782,790 B1 | 8/2010 | Nadeau et al. | |
| 8,180,916 B1 * | 5/2012 | Nucci et al. | 709/233 |
| 8,964,548 B1 * | 2/2015 | Keralapura et al. | 370/235 |
| 2001/0001608 A1 | 5/2001 | Parruck et al. | |
| 2003/0055806 A1 * | 3/2003 | Wong et al. | 707/1 |
| 2005/0091532 A1 * | 4/2005 | Moghe | 713/201 |
| 2005/0097209 A1 | 5/2005 | McDonagh et al. | |

(Continued)

FOREIGN PATENT DOCUMENTS

JP   2007151013 A   6/2007
WO   2005/109754 A1   11/2005

OTHER PUBLICATIONS

International Search Report and Written Opinion for related PCT Application No. PCT/US2014/010908, mailed on Jun. 13, 2014, in 12 pages.

(Continued)

*Primary Examiner* — Ebrahim Golabbakhsh
(74) *Attorney, Agent, or Firm* — Procopio, Cory, Hargreaves & Savitch LLP

(57) ABSTRACT

Systems and methods for generating a semantic description of operations between network agents. In an embodiment, packet-level traffic between two or more network agents is captured. The packet-level traffic is bundled into one or more messages, wherein each message comprises one or more elements. For each of the messages, the elements of the message are matched to one or more attributes, and the message is decoded into message data based on the matched attributes. The message data is then used to generate a semantic description of operations between the network agents.

36 Claims, 11 Drawing Sheets

(56) References Cited

U.S. PATENT DOCUMENTS

| | | |
|---|---|---|
| 2005/0149557 A1* | 7/2005 | Moriya et al. ............ 707/104.1 |
| 2006/0212942 A1 | 9/2006 | Barford et al. |
| 2007/0118665 A1 | 5/2007 | Philbrick et al. |
| 2008/0091405 A1 | 4/2008 | Anisimovich et al. |
| 2010/0020708 A1 | 1/2010 | Okada et al. |
| 2011/0082688 A1 | 4/2011 | Kim et al. |
| 2011/0252152 A1 | 10/2011 | Sherry et al. |
| 2011/0258610 A1 | 10/2011 | Aaraj et al. |
| 2012/0263182 A1 | 10/2012 | Enomoto et al. |

OTHER PUBLICATIONS

International Search Report and Written Opinion for PCT/US2014/068616, mailed on Feb. 25, 2015, in 6 pages.

Myers. "An O(ND) Difference Algorithm and Its Variations," Algorithmica, Nov. 1986, in 15 pages.

International Search Report and Written Opinion for PCT/US2013/023445, mailed on May 16, 2013, in 11 pages.

* cited by examiner

SYSTEMS AND METHODS FOR EXTRACTING STRUCTURED APPLICATION DATA FROM A COMMUNICATIONS LINK

PRIORITY

This application claims priority to U.S. Provisional Patent App. No. 61/593,075, filed on Jan. 31, 2012, and titled "System and Method for Extracting Structured Application Data from a Communications Link," the entirety of which is hereby incorporated herein by reference.

BACKGROUND

1. Field of the Invention

The invention is generally directed to information technology with features of network switching, routing, proxy, and database technologies, and, more particularly, to the extraction of semantic data, via a network tap that provides a (possibly incomplete) copy of traffic between two network agents with no substantial modifications to the existing network or application infrastructure.

2. Description of the Related Art

Over the last few decades, structured database technology has become a critical component in many corporate technology initiatives. With the success of the Internet, the use of database technology has exploded in many consumer and business-to-business applications. With the popularity of database architectures, new risks and challenges have arisen. Such risks and challenges include complex and difficult to identify performances issues and subtle gaps in security that can allow confidential data to be accessed by unauthorized users. Accordingly, what is needed are new, improved mechanisms for identifying these performance issues and closing these security gaps.

A large fraction of database applications use a database server which has structured data stored and indexed. Clients access the database server to store, update, and query the structured data. The clients may communicate with the database server using standard networking technology, such as Transmission Control Protocol (TCP), Internet Protocol (IP), Ethernet, and the like, using various physical or virtual media. While standard protocols are generally used for the lower levels of communications with the database server, higher-level protocols are often specific to a vendor and/or client-server architecture, and may not be fully specified. Vendors may not be technically able to publish these specifications, or may choose not to publish these specifications for other reasons.

Below the application and/or database layer, a sequenced byte protocol, such as TCP or Sequenced Packet Exchange (SPX), is generally used to ensure delivery of messages between client and server systems in the face of potentially unreliable lower-level transport mechanisms. These protocols may exchange multiple packets to deliver a single byte of data. The transmission and/or reception of such packets may be asynchronous, such that the order of the packets is not necessarily the same as the order of the byte stream required by the application or database layer. These protocols are designed to work when packets are lost or corrupted between two network agents, such as a client system and server system.

Many network sessions may be established between a server (e.g., database server) and one or more client systems. Generally, each session operates asynchronously with respect to the other sessions, and the data and control information from a plurality of sessions may overlap temporally. In addition, multiple encapsulation technologies and physical layer technologies may be used between a server and its clients.

There are a number of network-tapping technologies that can be used to extract a copy of the packet stream flowing between two or more network agents. However, a network tap attempting to observe an exchange will not witness an exact copy of the traffic as seen by either network agent. Rather, the network tap will receive a unique third-party view of the packets, which may comprise a subset or superset of the packets seen by the network agents.

While many uncertainties, as to encapsulation, session multiplexing, order, and validity of request data, may be resolved using data embedded in underlying protocols and transports, these mechanisms are designed to operate at either end of a network conversation (i.e., at the network agent). Furthermore, this embedded data is not able to fully resolve uncertainties in the actual content of a specific network conversation. In addition, in commonly used network architectures, the packet stream captured by a network tap is frequently damaged in some way. Moreover, the application protocols (e.g., Oracle's client-server protocol) are often not publicly specified. Thus, conventionally, it is impossible to derive full details of operations between a server and its clients using a network tap.

SUMMARY

Accordingly, systems and methods are disclosed which utilize the buffering from a network tap in conjunction with capture-and-analysis techniques to derive a detailed semantic description or model of operations between two network agents. This detailed model can then be used to detect and respond to performance issues and security gaps, particularly in the context of database-based applications.

In an embodiment, a method for generating a semantic description of operations between network agents is disclosed. The method comprises, using at least one hardware processor: capturing packet-level traffic between a first network agent and a second network agent; bundling the packet-level traffic into one or more messages, wherein each of the one or more messages comprises one or more elements; for each of the one or more messages, matching one or more of the one or more elements of the message to one or more attributes, and decoding the message into message data based on the matched one or more attributes; and generating a semantic description of operations between the first network agent and the second network agent based on the message data.

In an additional embodiment, a system for generating a semantic description of operations between network agents is disclosed. The system comprises: at least one hardware processor; and at least one executable software module that, when executed by the at least one hardware processor, captures packet-level traffic between a first network agent and a second network agent, bundles the packet-level traffic into one or more messages, wherein each of the one or more messages comprises one or more elements, for each of the one or more messages, matches one or more of the one or more elements of the message to one or more attributes, and decodes the message into message data based on the matched one or more attributes, and generates a semantic description of operations between the first network agent and the second network agent based on the message data.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
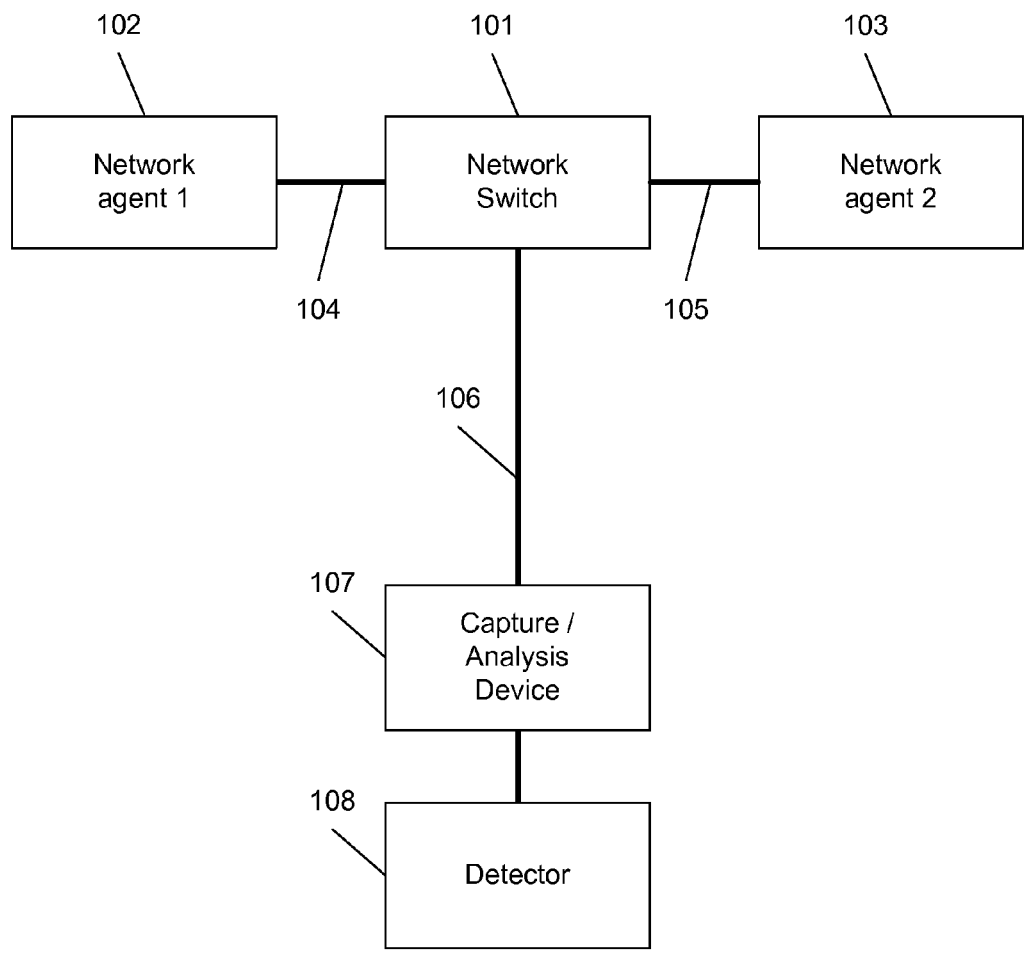
FIG. 1 illustrates an example architectural environment in which traffic between network agents may be captured for analysis, according to an embodiment.

Systems and methods are disclosed for generating a detailed semantic model or description of operations between two or more network agents. In an embodiment, the disclosed systems and methods are applied to network sessions comprising device interactions that are synchronous at the application layer. This includes, without limitation, remote procedure calls (RPCs) or similar request-and-response interactions, such as those utilizing Hypertext Transfer Protocol (HTTP). In these interactions, a first device transmits a request to a second device through one or more networks, and the second device returns a response to the first device via the one or more networks. Both the request and the response may comprise one or more packets transmitted between the devices. The packet-level flow between the request and response may overlap temporally (from the perspective of either device or a network-mirroring device) and/or may be collected from multiple points within the network architecture. In an embodiment, multiple network sessions between communicating network agents may generate packets that interleave arbitrarily without affecting operation of the disclosed systems and methods.

According to an embodiment, the systems and methods extract a model or description of semantic operations performed between two network agents from an imperfect copy of the network packet traffic exchanges between the network agents. This model may include, without limitation, raw performance data on each operation, descriptive metadata (e.g., query string, data types, data sizes, etc.), and/or actual data. When traffic is missing, out of order, or the exact specification of the traffic is unknown, a partial model of operations may still be generated and used at an application-layer level, and the framework of a session may be resynchronized based on a change in direction of data flow (e.g., between request and response messages).

Database queries or operations that update the data in a database may be serviced quickly or slowly by a database server, depending on the complexity of the data query or update operation, the instantaneous load being experienced by the database server, or by other factors which may be beyond the database server itself (e.g., the storage system, a varying virtual central processing unit (CPU) allotment, etc.). In an embodiment, by observing the time lag between a specific request and response, using the descriptive metadata (e.g., Structured Query Language (SQL) query string), and by observing the content and format of the data itself, the performance of many operational aspects of the database server can be determined in real time. In addition, the nature of data and actual data being updated or retrieved is latent in the network data packets flowing bi-directionally between a client system and server. By observing this traffic, inappropriate attempts to extract or change parts of the database may be detected. In an embodiment, semantics of the operations between a client system and server are extracted and analyzed using a copy of the existing traffic. Based on this analysis, traffic may be modified to accelerate or otherwise improve performance and/or mitigate against various forms of attacks.

In an embodiment, a capture component is placed within a network topology, such that it is exposed to traffic transmitted between the plurality of network agents to be analyzed. Observed packets may be copied and transmitted to a filter component via a series of network links and/or buffer stages. The filter component may then discard packets that are not related to the network agents and/or applications being analyzed. The remaining packets may be passed to a reassembly component, which builds a representation of the byte stream for each network session using sequence data and other descriptive data in the packets and/or the time of receipt of the packets.

Once the representation of the byte stream for a session is built by the reassembly component, it may be passed to an application-layer analysis component. The analysis component may unpack the contents of the byte stream into the request and response data and descriptions to generate a semantic operation model of the traffic. This semantic model may be used by an application-specific component, which uses the semantic model to detect security and performance issues and/or mitigate detected breaches of a security policy.

It should be understood that the capture component, filter component, reassembly component, application-layer analysis component, application-specific component and any other components or modules discussed herein may be implemented in hardware, software, or both hardware and software, and may be separate or integrated components. For instance, the filter component, reassembly component, application-layer analysis component, and application-specific components may be software modules executing on hardware of a capture device or on a separate device that is communicatively coupled to the capture device.

Layers Overview

At the outset, the layers of the Open System Interconnection (OSI) model will be described. The OSI model defines a networking framework to implement protocols in seven layers. A layer serves the layer above it and is served by the layer below it.

Layer 7: Application Layer. This layer supports applications and end-user processes. The application layer interacts with software applications that implement a communication component. Functions of the application layer include identifying communication partners, determining resource availability, and synchronizing communications.

Layer 6: Presentation Layer (or Syntax Layer). This layer translates between application formats and network formats in order to provide independence from differences in data representations (e.g., encryption). The presentation layer transforms data from the network into a form that the application layer can understand, and formats and encrypts data from an application to be sent across a network.

Layer 5: Session Layer. This layer controls the connections between computers. It establishes, manages, and terminates connections between applications. The session layer is commonly implemented explicitly in application environments that use RPCs.

Layer 4: Transport Layer. This layer provides transparent transfer of data between network agents, and is responsible for end-to-end error recovery, segmentation and de-segmentation, and flow control. Flow control involves determining whether data is coming from more than one application, and integrating each application's data into a single stream for the physical network. The transport layer ensures complete data transfer.

Layer 3: Network Layer. This layer provides the functional and procedural means of transferring variable length data sequences from a source host on one network to a destination host on a different network, while maintaining the quality of service requested by the transport layer. It creates logical paths for transmitting data from node to node. It provides switching, routing, forwarding, addressing, internetworking, error-handling, congestion-control, and packet-sequencing functions. The network layer determines the way that data will be sent to a recipient agent.

Layer 2: Data Link Layer. This layer provides the functional and procedural means to transfer data between network agents and to detect and possibly correct errors that may occur in the physical layer. The data link layer encodes and decodes data packets, provides transmission protocol knowledge and management, and handles errors in the physical later, as well as flow control and frame synchronization. It assigns the appropriate physical protocol to data, and defines the type of network and packet-sequencing. The data link layer is subdivided into a Media Access Control (MAC) layer and a Logical Link Control (LLC) layer. The MAC layer controls how a network agent gains access to data and the permission to transmit data. The LLC layer controls frame synchronization, flow control, and error-checking.

Layer 1: Physical Layer. This layer defines the electrical and physical specifications for devices. It conveys the bit stream (e.g., via electrical, light, or radio signal) through the network at the electrical and/or mechanical level. The physical layer provides the hardware means of sending and receiving data on a carrier, including defining cables, cards, voltage levels, timing, and other physical aspects.

System Overview

FIG. 1 illustrates an example system for capturing and analyzing interactions between two or more network agents, according to an embodiment. The system may comprise a set of one or more capture-and-analysis devices (e.g., servers) 107 which host and/or execute one or more of the various functions, processes, and/or software modules described herein. In addition, device(s) 107 are communicatively connected to a device, such as network switch 101, via a communicative path 106. Network switch 101 is positioned on a network path 104/105 between a first network agent 102 and a second network agent 103. The network comprising network path 104/105 may comprise any type of network, including an intranet and/or the Internet, and network agents 102 and 103 may communicate using any standard and/or proprietary protocols. For instance, network agents 102 and 103 may communicate with each other through the Internet using standard transmission protocols, such as HTTP, Secure HTTP (HTTPS), File Transfer Protocol (FTP), and the like.

In an embodiment, capture-and-analysis device(s) 107 may not be dedicated device(s), and may instead be cloud instances, which utilize shared resources of one or more servers. It should be understood that network agents 102 and 103 and capture-and-analysis device(s) 107 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, and the like. Network agent 102, network agent 103, and/or device(s) 107 may also comprise or be communicatively coupled with one or more databases, such as a MySQL, Oracle™ IBM™, Microsoft™ SQL, Sybase™, Access™, or other types of databases, including cloud-based database instances. In addition, while only two agents 102 and 103, one switch 101, and one set of capture-and-analysis device(s) 107 are illustrated, it should be understood that the network may comprise any number of agents, switches, and capture-and-analysis devices.

Figure 2:
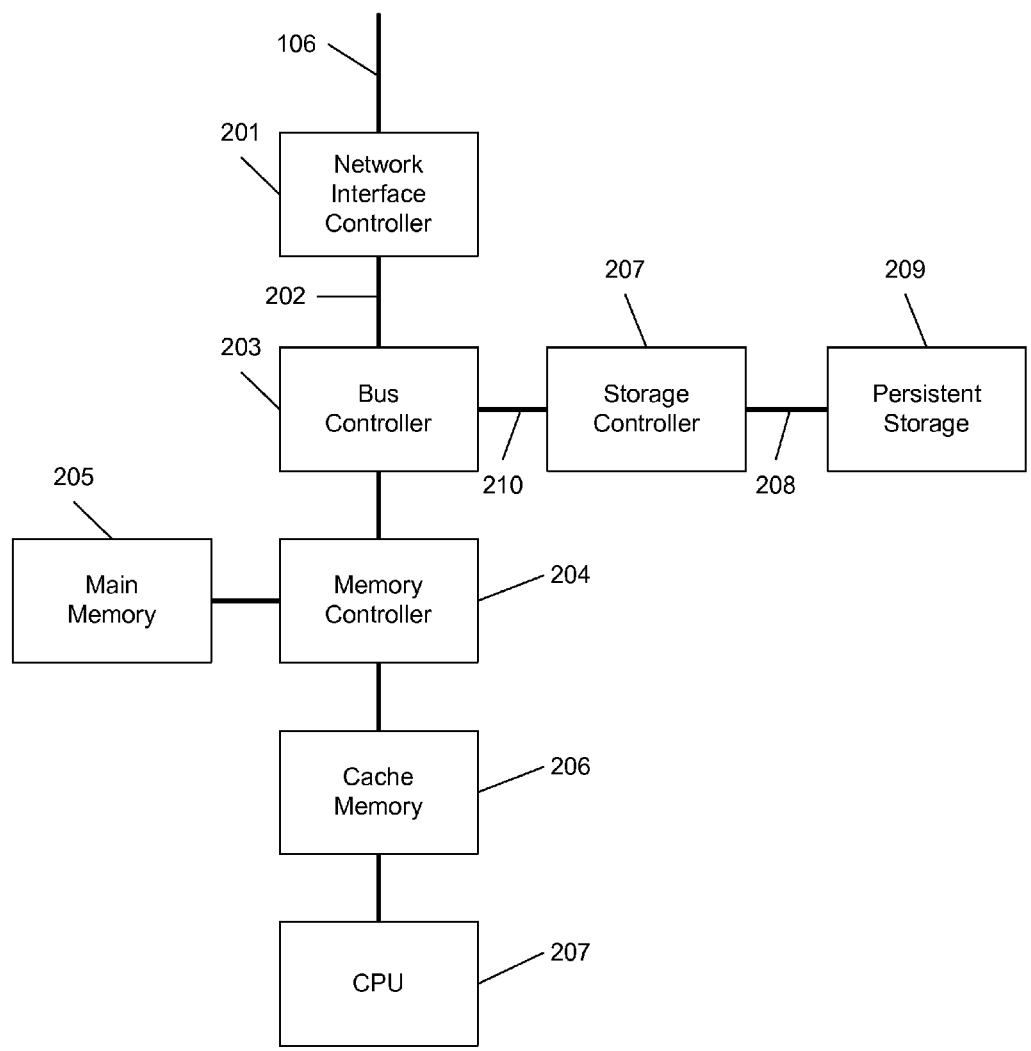
FIG. 2 illustrates an example hardware architecture for a capture-and-analysis device, according to an embodiment.

FIG. 2 illustrates an example hardware architecture for capture-and-analysis device(s) 107, according to an embodiment. The internal hardware architecture may comprise standard, commercially-available components. A copy or mirror of the traffic sent between network agents 102 and 103, which comprises network packets, may be received from network switch 101 via interface 106 (e.g., 1000BASE-T link) by a network interface controller (NIC) 201. A bus controller 203 may transfer packet data from NIC 201 via bus 202 (e.g., a Peripheral Controller Interface (PCI) bus) through memory controller 204 into main memory 205.

Memory controller 204 provides a path for CPU 207 to read data from and write data to main memory 205 via cache memory 206. CPU 207 may execute a program comprising software instructions stored in main memory 205 which implement the processes described herein.

Storage controller 207 may be connected via bus 210 to bus controller 203. Storage controller 207 may read and write data (e.g., a semantic model) and program instructions to a persistent storage device 209 via link 208. For example, storage device 209 may comprise a commercial one-terabyte Serial Advanced Technology Attachment (SATA) hard drive, and link 208 may comprise a SATA-II link. However, it should be understood that any storage device and associated interface may be used.

Figure 3:
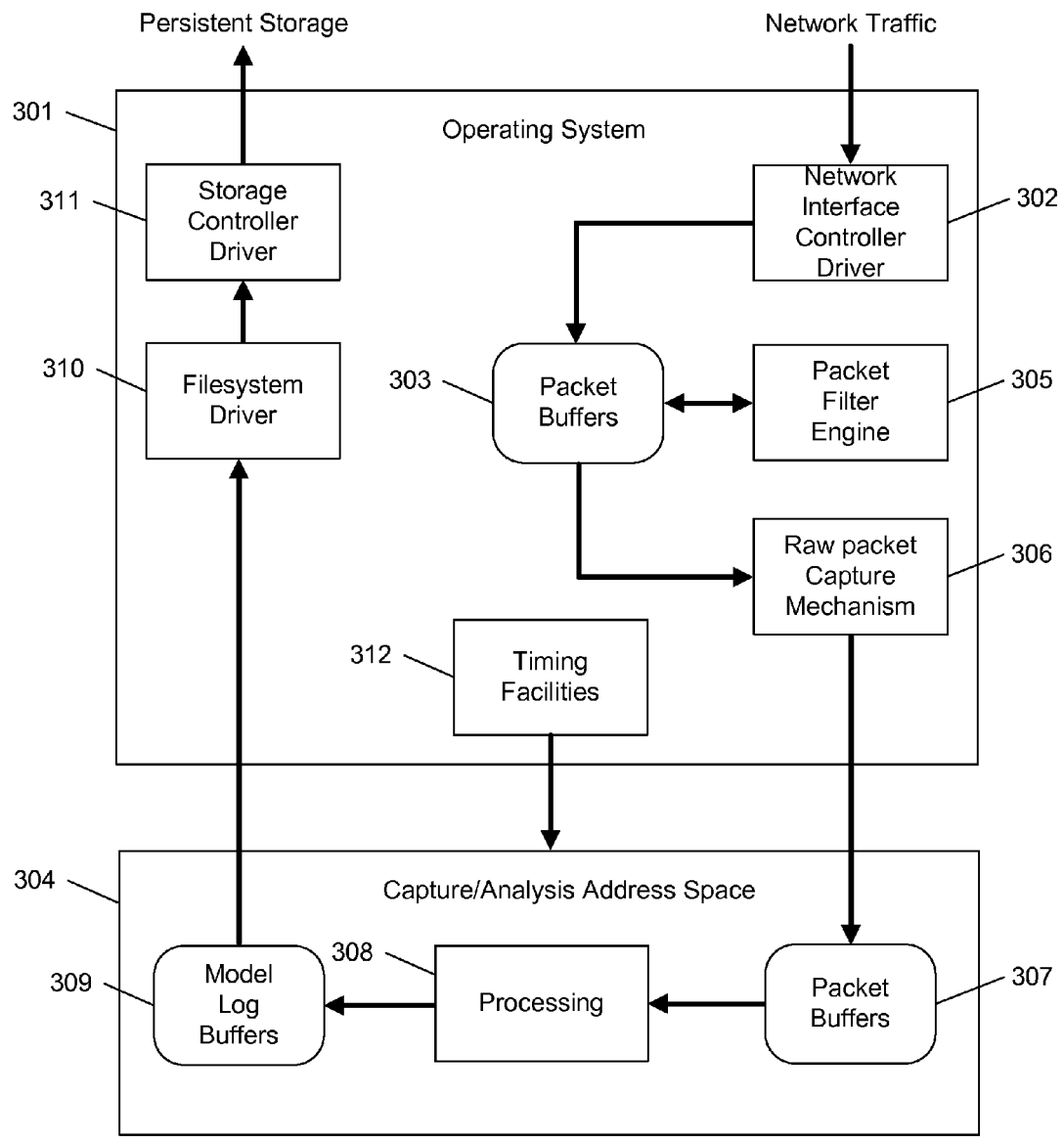
FIG. 3 illustrates an example software architecture for a capture-and-analysis device, according to an embodiment.

FIG. 3 illustrates an example high-level software architecture for capture-and-analysis device(s) 107, according to an embodiment. In this example, the architecture comprises an operating system kernel 301 (e.g., Linux 3.1) and related utilities which manage the physical hardware architecture described above. Software program or modules 304, which comprise the capture-and-analysis processes described herein, are copied into memory by operating system kernel 301. These modules 304 may then be executed by CPU 207 to analyze and process received packets, and generate a semantic model of the operations taking place between network agents 102 and 103.

Network interface controller driver 302 controls NIC 201 and marshals packets received on network link 106 into packet buffers 303 in main memory 205. Some packets may be discarded by a packet filter engine 305 under the direction of capture-and-analysis modules 304. For example, packet filter engine 305 may discard packets that are not related to specific protocols of interest to the model-building mechanism of modules 304, such as administrative traffic (e.g., Address Resolution Protocol (ARP)) or other broadcasts or traffic between network agents other than those of interest. Raw packet capture module 306 may then copy the retained packets into ingress packet buffer(s) 307 used by capture-and-analysis modules 304.

Capture-and-analysis modules 304 perform processing 308 (as described elsewhere herein) on the ingress packet traffic placed in packet buffers 307 to generate a semantic model of the operations taking place between network agents 102 and 103. This model may be incrementally placed into model log buffers 309, and then written by file system driver 310 (e.g., in the context of a Linux operation system, an Ext4 file system driver) and storage controller driver 311 to persistent storage device 209.

Kernel 301 may provide timing facilities 312 to the capture-and-analysis modules 304, so that they may interpret the packet traffic in buffers 307 during processing 308. Timing facilities 312 may include a mechanism to retrieve the current time of day at high resolution (e.g., microseconds or greater). Modules 304 may compare the time, retrieved from timing facilities 312, to timestamps written by network interface controller driver 302 into the packets as they are received. These timestamps may be used, for example, to determine when expected packets are to be considered lost by the reassembly and protocol-analysis code.

Packet Capture Mechanism

In an embodiment, packet traffic between network agents 102 and 103 is copied by a network mirror or Switched Port Analyzer (SPAN) tap mechanism. For example, a network switch 101 may be placed in the path 104/105 between network agents 102 and 103, such that all packets transmitted by network agent 102 to network agent 103, and vice versa, are transmitted through switch 101 via communication links 104 and 105. In an embodiment, network switch 101 may be a Layer 2 (i.e., the data link layer) network switch. Switch 101 may be configured to transmit a copy of all packets, received from both network agents 102 and 103 via network links 104 and 105, respectively, to capture-and-analysis device(s) 107 via communication link 106. Each of the network links 104, 105, and/or 106 may conform to the Institute of Electrical and Electronics Engineers (IEEE) 802.3ab (1000BASE-T) Ethernet standards.

In addition, one or more detectors 108, which may be local (e.g., executed on the same machine) or remote to capture-and-analysis device 107 (e.g., executed on separate machine(s) communicatively connected to capture-and-analysis device 107 via one or more networks), may be provided. Detector(s) 108 may process the output of capture-and-analysis device 107. For example, detector(s) 108 may utilize semantic descriptions of operations between network agents 102 and 103, generated by capture-and-analysis device 107, to create one or more higher-level models, including multiple layers of higher-level models and different types of higher-level models (e.g., models specific to a security application, a performance application, and/or for other types of applications). Modules of capture-and-analysis device 107 may interface with detector(s) 108 via one or more application programming interfaces (APIs).

Figure 7:
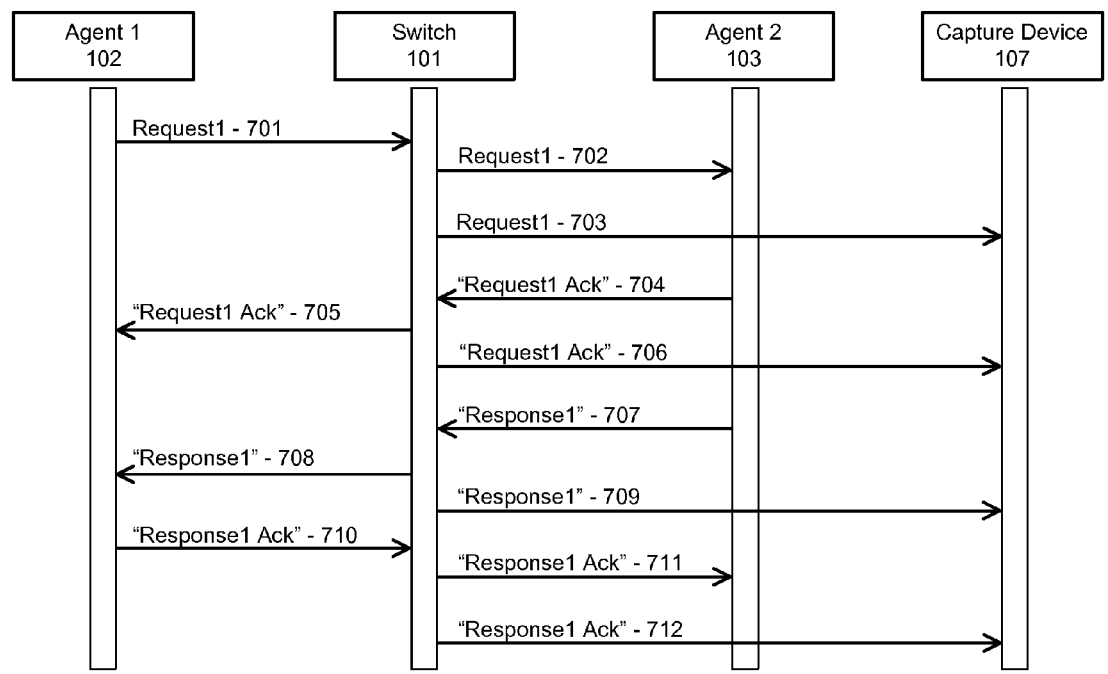
FIG. 7 is a ladder diagram illustrating packet interactions in a transaction from a perspective that is external to a capture-and-analysis device or module, according to an embodiment.

FIG. 7 illustrates an example request and response interaction between two network agents 102 and 103, according to an embodiment. The packets exchanged in the interaction may comprise an Ethernet header, Internet Protocol (IP) header, and TCP header. A request 701, which may comprise a complete Layer 7 request payload in one or more packets, can be transmitted from network agent 102 via link 104 to switch 101. Request 701 may be addressed to network agent 103. Accordingly, switch 101 transmits a copy 702 of request 701 on link 105 to network agent 103. However, switch 101 also transmits a copy 703 of request 701 on link 106 to capture-and-analysis device(s) 107.

Network agent 103 may send an acknowledgement 704 to network agent 102 via link 105. Acknowledgement 704 is received at switch 101, which is on the communication path 105/104 between network agents 103 and 102. Switch 101 sends a copy 705 of acknowledgement 704 on link 104 to network agent 102, and also transmits a copy 706 of acknowledgement 704 on link 106 to capture-and-analysis device(s) 107. Acknowledgement 704 may comprise one or more packets that indicate to network agent 102 that request 701 was received.

Network agent 103 may send a response 707 to network agent 102 via link 105. Response 707 is received at switch 101, which sends a copy 708 of response 707 on link 104 to network agent 102. Switch 101 also transmits a copy 709 of response 707 on link 106 to capture-and-analysis device(s) 107. Response 707 comprises one or more packets that form a response to request 701.

Network agent 102 may send an acknowledgement 710 to network agent 103 via link 104. Acknowledgement 710 is received at switch 101, which is on the communication path 104/105 between network agents 102 and 103. Switch 101 sends a copy 711 of acknowledgement 710 on link 105 to network agent 103. Switch 101 also transmits a copy 712 of acknowledgement 710 on link 106 to capture-and-analysis device(s) 107. Reception of acknowledgement copy 711 by network agent 103 completes a single application-level request-and-response cycle that began with the transmission of request 701 by network agent 102.

Figure 4:
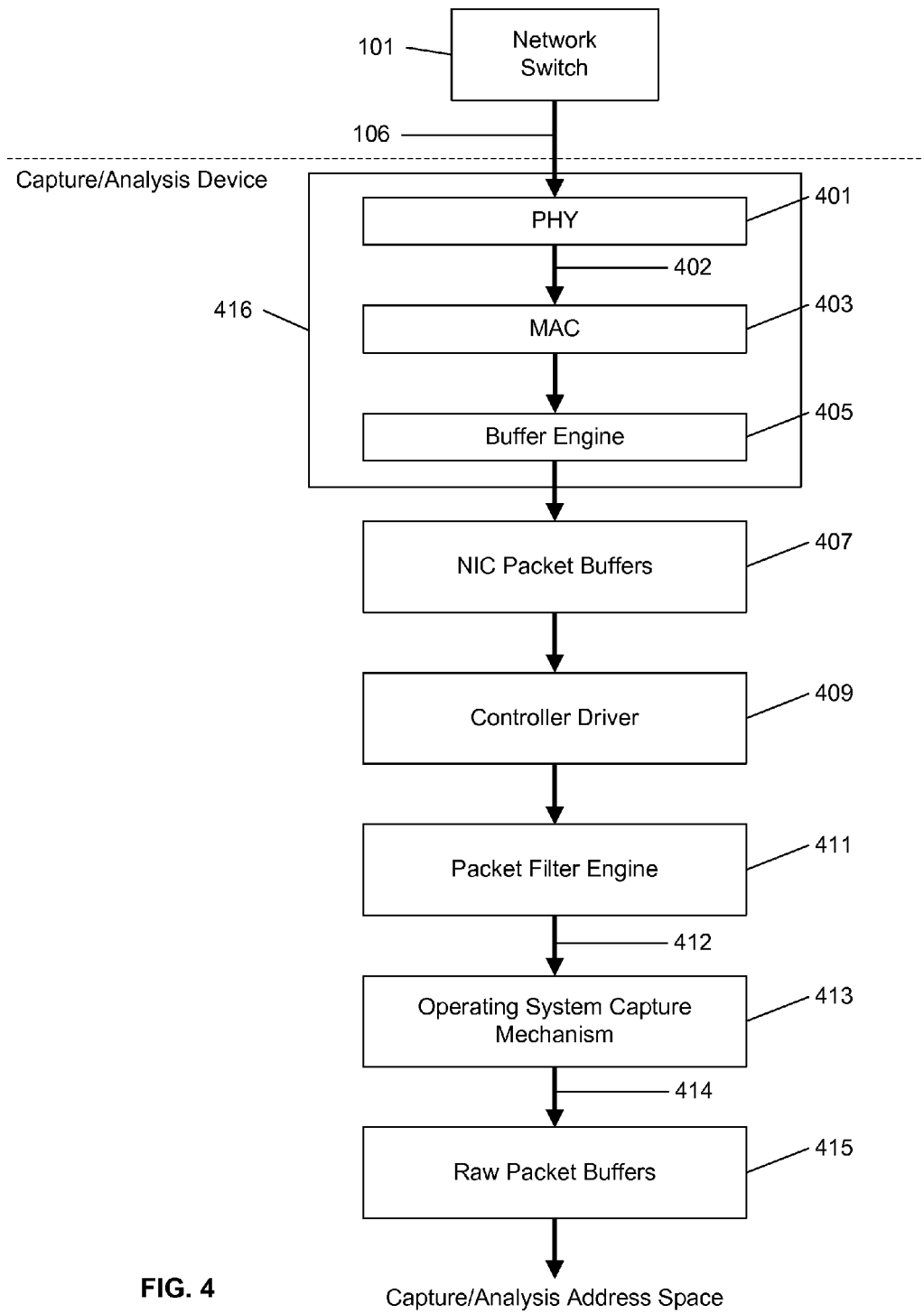
FIG. 4 illustrates example components and data flows related to capturing packet-level traffic and preparing the captured traffic for analysis, according to an embodiment.

FIG. 4 illustrates an example process for capturing a packet, according to an embodiment. In an embodiment, the processing of packets in capture-and-analysis device(s) 107 begins with a packet being received at NIC 416 or 302 from network switch 101 via link 106, which may be an Ethernet link. Electrical signals used on network link 106 may be demodulated, for example, by a Media Independent Interface (MII) for an Ethernet physical transceiver (PHY) 401. MII/PHY 401 may also recover data and clock information. The demodulated data and clock information may be passed as a digital bit stream 402 to a network MAC 403, which separates the stream into discrete packets and applies an error-correction code to verify that the packets have not been corrupted during transmission. Corrupted packets may be discarded during this phase. In an embodiment, network PHY 401 and MAC 403, along with their attendant interfaces, may be defined by IEEE 803.3ab (1000BASE-T) and/or related Ethernet standards, and may be implemented as part of a commercially available NIC.

In an embodiment, buffer engine 405 in NIC 416 assembles the data from MAC 403 into representations of the packets, and stores the representations in packet buffer(s) 407. Controller driver 409 (which may correspond to driver 302 in FIG. 3) passes the received packets stored in packet buffer 407 through a packet filter engine 411. Packet filter engine 411 may comprise or utilize instructions generated by a program which compiles an optimized packet filter from a high-level network description. The resulting packet filter discards packets that are not of interest to model-building process 308. What remains are TCP/IP packets that are intended for reception by the network agents of interest (e.g., network agents 102 and 103) and/or for specific TCP ports. The filter (e.g., the specific agents and/or TCP ports of interest) may be configured by a user of the system.

In an embodiment, the filter may comprise a set of one or more specifications or criteria, which may be specified via a user interface and/or as text lines in a configuration file. For example, a specification may include, without limitation, one or more IP addresses (e.g., defined as singletons or ranges), one or more TCP port numbers (e.g., defined as singletons or ranges), and/or one or more Virtual Local Area Network (VLAN) tags. In addition, each of the specifications may be positive or negative. A positive specification will keep or allow packets meeting the specification, whereas a negative specification will discard or deny packets meeting the specification. Implicit specifications may also exist. For instance, completely empty or non-TCP packets may be discarded without an explicit specification being established. For each packet, the set of specifications are processed in order until one of them matches the packet in question. Once a packet is matched to one of the specifications, the action specified (e.g., allow or deny) is enacted. Denied packets are discarded, while allowed packets are passed on to the next module in the analysis chain.

An operating system capture mechanism or facility 413 (e.g., in the case of a Linux operating system, AF_PACKET, version 2) may copy the packets remaining after the first-stage filter 411 into raw packet buffers 415. Raw packet buffers 415 may be shared with, or accessible by, the capture-and-analysis address space 304.

Packet Analysis

Packets placed in raw buffer 415 by operating system capture mechanism 413 are processed or analyzed by the programs or modules residing in the capture-and-analysis address space 304. In an embodiment, the result of this analysis is a semantic model of the operations between two network agents at Layer 7 (i.e., the application layer). For instance, this model may describe the database operations between a database client and a database server in terms of events and their surrounding contexts.

Figure 5:
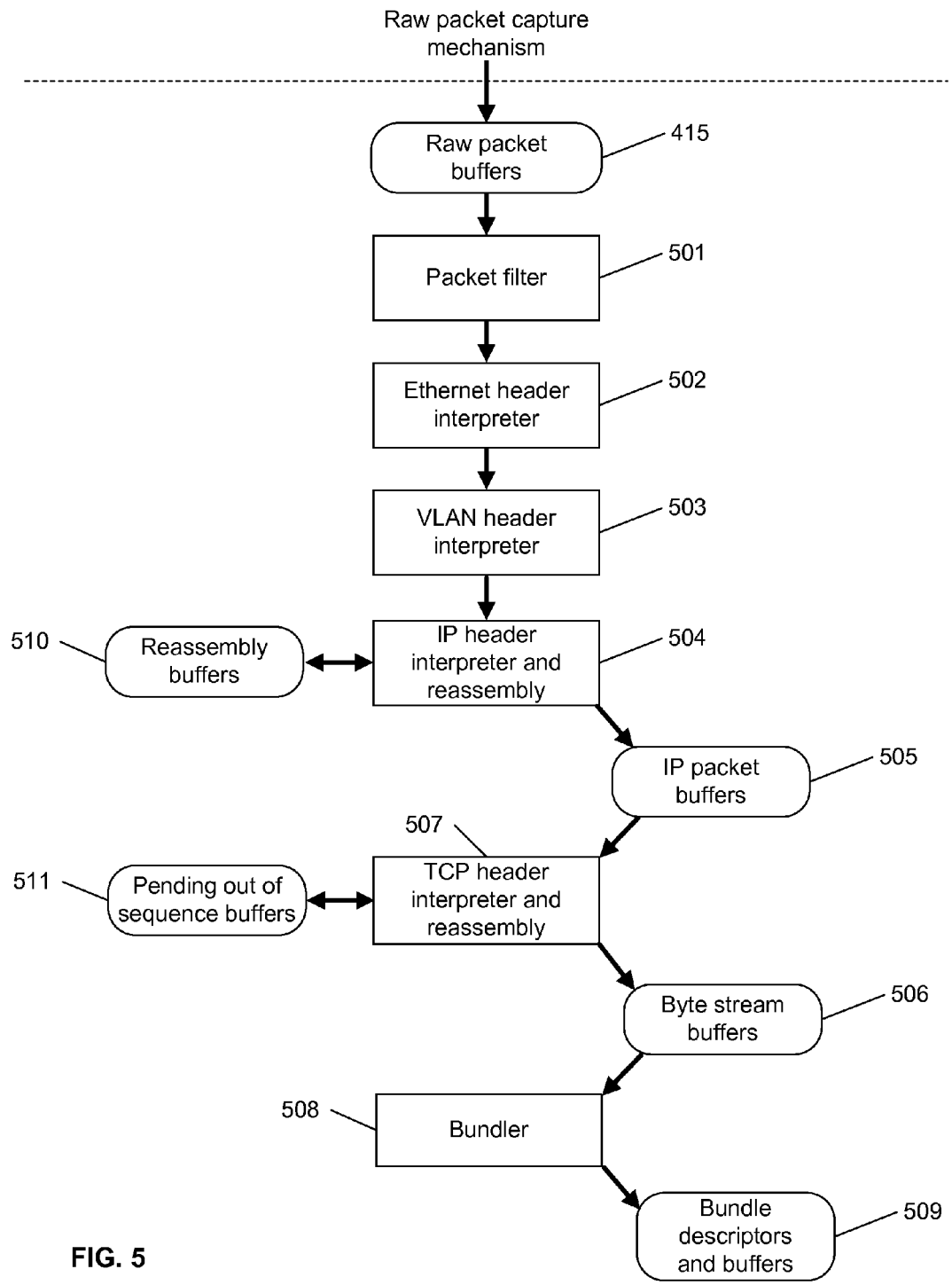
FIG. 5 illustrates example components and data flows related to reassembly of packet-level traffic into byte streams, request and response bundles, and ultimately a structured model of operations taking place between network agents, according to an embodiment.

In an embodiment illustrated in FIG. 5, packets are processed by capture-and-analysis modules 304 after they are placed in raw packet buffers 415 by operating system capture mechanism 413. A second-stage packet filter 501 may be applied to discard non-TCP packets that were not previously discarded by in-kernel first-stage filter 411. Filter 501 may also discard TCP control packets (e.g., packets with all flags set) that are not used or are harmful to the reassembly process, but can not be easily removed by first-stage filter 411. Notably, in an embodiment, first-stage filter 411 is intended to run with very little state or configuration information, whereas second-stage filter 501 has access to broad real-time state provided by higher layers.

Examples of packets that may be harmful include those that indicate unusual or unexpected conditions in TCP state. For instance, a "christmas tree" packet with all control bits set may cause the internal state machine of the TCP stack to misinterpret the packet and use the data in it. This data may potentially hide an attack in a properly formatted packet received around the same time. As another example, harmful packets may include a packet that duplicates the TCP sequence space of a previous packet. Sending both sets of data for processing by a higher layer would cause the higher layer to see the invalid data. Another example of harmful packets are packets with invalid checksums or length fields. These may be misinterpreted by higher layers, causing them to read un-initialized storage space (e.g., a buffer-overrun type of attack). As yet another example, packets deemed by a higher layer to not be of interest may be harmful. Such packets are identified by their source/destination IP/port and VLAN tuple, and this identification changes dynamically. It is not practical to recompile a specific filter every time a higher layer identifies a TCP connection as "uninteresting," so the filtering is done in a place where dynamic state is available.

In an embodiment, an Ethernet header interpreter 502 determines the end of the Ethernet header. Ethernet header interpreter 502 may then discard packets that are not tagged as IP unicast or VLAN (e.g., according to IEEE 802.1Q). For instance, multicast packets may not be of interest and can drain resources needed to handle a high-load situation, whereas VLAN-tagged packets may need to be kept so that the underlying "unicast" header and other headers can be extracted from them in order to decide whether or not they should be kept. A VLAN header interpreter 503 may extract the VLAN identifier as an identifier attribute on the final model for packets with a VLAN header. The extracted VLAN header may be used to associate a packet with a TCP connection. A TCP connection, in this context, may be identified by a tuple of source IP, destination IP, source TCP port, destination TCP port, VLAN identifier, and/or physical receive port. The use of the VLAN identifier and receive port allows the system to differentiate traffic seen on different virtual or real networks that may be using cloned, identical IP configurations. VLAN header interpreter 503 may also discard any VLAN-tagged packets that are not IP.

In an embodiment, an IP interpreter and reassembler 504 (which may be compliant with Request for Comments (RFC) 791) extracts the source address and destination address from packets, and reassembles sequences of fragmented IP packets into single IP packets in IP packet buffers 505. Fragments of IP packets may be held in reassembly buffers 510 until either all other fragments for the IP packet are received or a timeout occurs. If a timeout occurs, all fragments for the IP packet may be discarded, or, alternatively, assembled as incomplete and optionally marked as incomplete. A short timeout on packets held for reassembly can ensure that memory usage is kept in check in a fragmented environment with high packet loss.

Completed IP packets in IP packet buffers 505 may be processed by a TCP header interpreter and stream reassembler 507 (which may be compliant with RFC 793). TCP header interpreter and stream reassembler 507 may sort IP packets into streams of data per TCP connection and data direction (e.g., from agent 102 to agent 103, or from agent 103 to agent 102), and store the sorted IP packets in byte stream buffers 506. In other words, TCP header interpreter and stream reassembler 507 may maintain a byte stream buffer 506 for each TCP stream direction. Out-of-sequence data may be held in pending data buffers 511. As in-sequence data for a given TCP stream direction is identified, it may be appended to the corresponding byte stream buffer 506. The data in byte steam buffers 506 hold ordered, contiguous, and non-duplicated payload data for each specific TCP session in each specific direction. As in-order TCP data is added to a connection-specific byte stream buffer 506, a bundler 508 may be notified. Bundler 508 is also notified if a message boundary is detected (e.g., from a control packet, from a change in direction of traffic, or from a timeout that indicates that no additional data has been received on a stream for a predetermined period of time).

Thus, pre-Layer 7 processing starts with raw Ethernet packets, and ends with byte stream buffers and an event stream which describes notable events in a session. For example, the notable events in a TCP session may comprise an indication that in-order TCP data has been added to the byte stream buffer corresponding to the TCP session, an indication that no additional data has been added after a timeout period, or an indication that a TCP control message has been received which closes the session. The byte and event streams may be passed to bundler 508, which commences the Layer 7 portion of the analysis process.

Application Layer Processing

A. Bundling

A "bundle" is a complete request message or a complete response message at the application layer. Bundler 508 may use several strategies to determine the boundaries of a bundle (e.g., using control packets, data direction, or timeouts) and send a bundle of data on to the protocol analysis modules. For instance, boundary determination methods may comprise one or more of the following:

Data Direction: in-sequence data received from the reassembler for a single session will change directions, for example, at the boundary between the request message and the response message. This change of direction may be used to indicate an end-of-message boundary. For example, a change of direction may be used to indicate an end to request message 701 and/or the beginning of an acknowledgement message 704 or response message 707. Thus, the very nature of request-and-response interactions may be used to place markers in a data stream to indicate message boundaries (or otherwise indicate message boundaries) that could not have otherwise been deduced without perfect knowledge and capturing.

Reassembler Activity Timeout: at the end of a message, where no additional traffic is immediately forthcoming (e.g., typically a response), a time tick from the reassembler or an expiration of a timer may be used to indicate an end-of-message boundary. For example, the occurrence of a timeout, following receipt of a packet of response message 707, may be used to indicate and end to response message 707.

Reassembler Missing Segment: if a segment of a message is missing, a timeout may be used to indicate a message boundary. A missing message segment may represent a TCP packet which should have been received with payload from the middle of a request or response stream. An incomplete message may be marked as incomplete. In many cases, protocol handlers can still extract sufficient data from the incomplete message to build a model. For example, an expiration of a timer or an occurrence of a timeout, following receipt of a prior segment or other event which results in an expectation of the missing segment, may be used to indicate an end to a request or response message. The incomplete request or response message may be marked as incomplete. An interpreter (e.g., TNS protocol interpreter 601 and/or TTC protocol interpreter 602) may use a detected gap, resulting from packet loss, to determine if it can extract data, and how much data it can extract from the data that it has, without having to receive all of the data.

In an embodiment, bundler 508 provides bundles of in-sequence unidirectional application traffic and associated descriptive data to an application protocol interpreter (e.g., interpreter 601). Bundler 508 needs no knowledge of the application protocol specification, and may pass incomplete traffic (i.e., bundles with one or more regions of missing in-sequence data) to the application protocol interpreter if segments or packets were lost.

Figure 8:
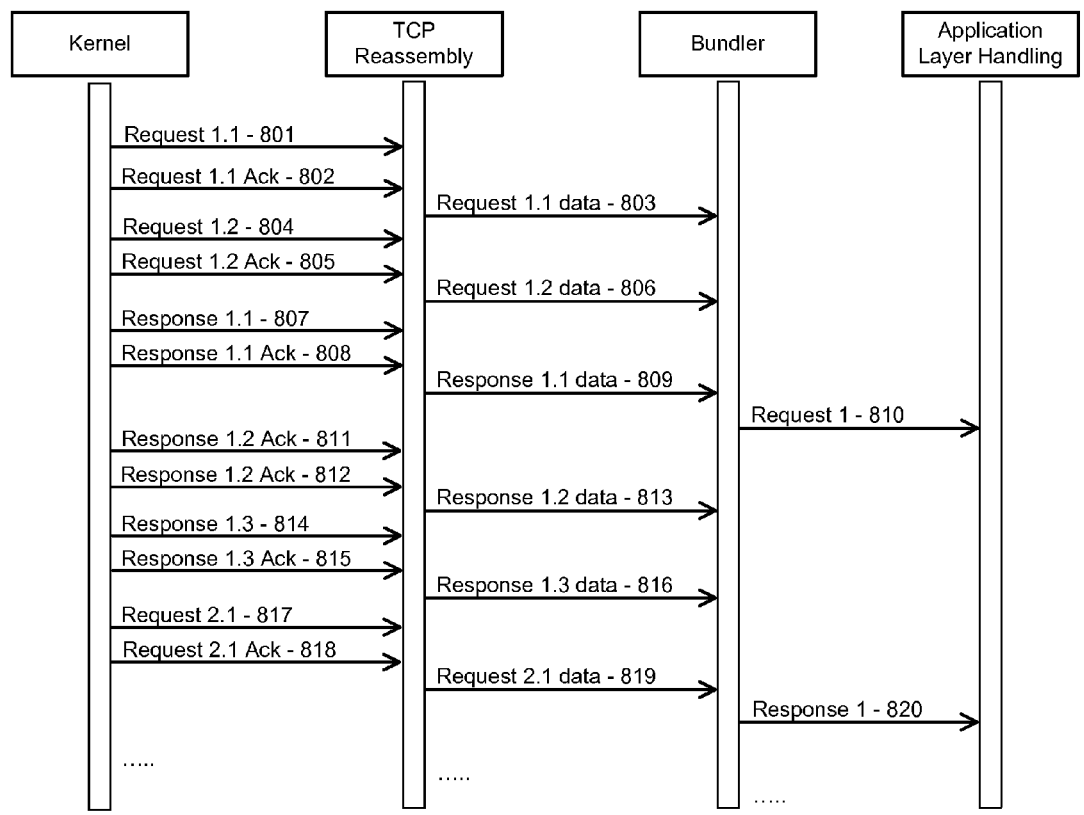
FIG. 8 is a ladder diagram illustrating packet processing for a transaction from a perspective that is internal to a capture-and-analysis device or module, according to an embodiment, wherein the elements of the first request (e.g., elements 801 and 803) represent packets, the elements of the first request data (e.g., elements 803 and 806) represent contiguous streams of byte data, and the first request 810 represents a bundle of stream data that corresponds to message boundaries.

FIG. 8 illustrates an example of a process for bundling a request message and response message from raw packets placed into raw packet buffers 415 by kernel 301. The packets presented to the analysis modules are those sent by switch 101. (Refer back to the description of FIG. 7 for an example of external packet handling.) In the example illustrated in FIG. 8, the first request requires two payload packets (numbered 1.1 and 1.2) and three response packets (numbered 1.1, 1.2, and 1.3).

In an embodiment, the TCP reassembly phase illustrated in FIG. 8 comprises processing by second-stage packet filter 501, Ethernet header interpreter 502, VLAN header interpreter 503, IP header interpreter and reassembler 504, and TCP header interpreter and reassembler 507. The arrows showing request and response data, provided by the TCP reassembler 507 to bundler 508, represent the byte stream buffers 506. The full request and response data, resulting from bundler 508, comprise bundle descriptors and buffers 509. Bundle descriptors and buffers 509 provide the output of bundler 508 to the first stage of Layer 7 protocol interpretation (e.g., TNS protocol interpreter 601 in an Oracle™-specific context).

In the message flow illustrated in FIG. 8, the first request segment 801 of the request transmitted from network agent 102 and the first segment 802 of the acknowledgement (ACK) transmitted from network agent 103 are received. Reassembly renders the payload of first segment 801 as a stream of request data 803 to bundler 508. This provision of the payload of first segment 801 may be provided before reception of ACK 802, or may be provided after reception of ACK 802 which indicates that first request segment 801 was successfully received by network agent 103. In addition, the ACK messages may be used by the reassembler to shortcut the timeout process. For instance, if an ACK message is seen for a payload packet that was not witnessed, it is likely that the missing packet was lost in the capture path. In either case, when bundler 508 receives first request data 803, there is no indication yet that the message is complete. Thus, bundler 508 queues first request data 803.

The second and final request segment 804 of the request from network agent 102 and the corresponding ACK 805 from network agent 103 are then received by the reassembler. The reassembler appends this second request segment 804 in sequence to the current stream of request data to bundler 508, and provides the payload data 806 of second request segment 804 to bundler 508. Since bundler 508 still has no indication that the message is complete, bundler 508 queues second request data 806. In other words, bundler 508 appends second request data 806 to first request data 803.

In the illustrated example, network agent 103 formulates a three-segment response to the request from network agent 102. The first segment 807 of the response from network agent 103 and the corresponding ACK 808 from network agent 102 are received. The reassembler provides the payload data 809 for first response segment 807 to bundler 508. Bundler 508 detects that the direction of traffic has changed, and determines that the previous message bundle it was collating is now complete. Thus bundler 508 sends this message bundle 810 (i.e., the full request from network agent 102 to network agent 103 comprising request data 803 and 806) to a Layer 7 protocol interpreter for further analysis.

The additional two segments 811 and 814 of the response from network agent 103 to network agent 102, and the corresponding ACK messages 812 and 815, are received. Second response segment 811 and third response segment 814 are processed into data streams 813 and 816, respectively, and provided to bundler 508. Bundler 508 collates first response data 813 and second response data 816 (i.e., appends data 813 and 816 to data 809), but does not yet pass them on to the Layer 7 protocol interpreter.

Next, a first segment 817 of a second, new request from network agent 102 to network agent 103 and the corresponding ACK 818 are received. The reassembler sends the request data 819 from request segment 817 to bundler 508. Bundler 508 detects that the direction of data transmission has changed, and issues the complete response 820 (i.e., comprising response data 809, 813, and 816), corresponding to the first request, to the Layer 7 protocol interpreter.

B. Application Protocol Decoding

Bundles 509, representing requests and responses, are processed by higher-level protocol processing to build a semantic model of the operations taking place between the two network agents 102 and 103. While this higher-level protocol processing may sometimes be described herein in the context of an Oracle™ client-server connection, it should be understood that this description is merely illustrative. The systems and methods disclosed herein may be applied to or generalized for other applications and contexts as well.

In an example embodiment specific to an Oracle™ client-server connection, a Transparent Network Substrate (TNS) protocol interpreter 601 may be provided which unpacks the procedure call and response payloads and asynchronous messages from TNS wrapper structures found in bundles 509. TNS is a multiplexing and asynchronous message wrapper protocol used by the Oracle™ client-server protocol. It should be understood that alternative or additional interpreters may be used for other protocols. For instance, Microsoft™ SQL Server uses Tabular Data Stream (TDS) and Symmetric Multiprocessing (SMP) wrapper protocols, which may be abstracted similarly to TNS. LDAP, MySQL, and Postgresql each use header wrapper protocols. In addition, HTTP is a header/wrapper protocol for eXtensible Markup Language (XML) traffic or HyperText Markup Language (HTML) traffic. An interpreter can be constructed for any one or more of these protocols and used as an alternative or in addition to interpreter 601.

In addition, in an embodiment, a Two Task Common (TTC) protocol decoder or interpreter 602 may extract remote procedure verbs, parameters, and result payloads from each request bundle and response bundle. The TTC protocol provides character set and data type conversion between different characters sets or formats on a client and server.

Figure 9:
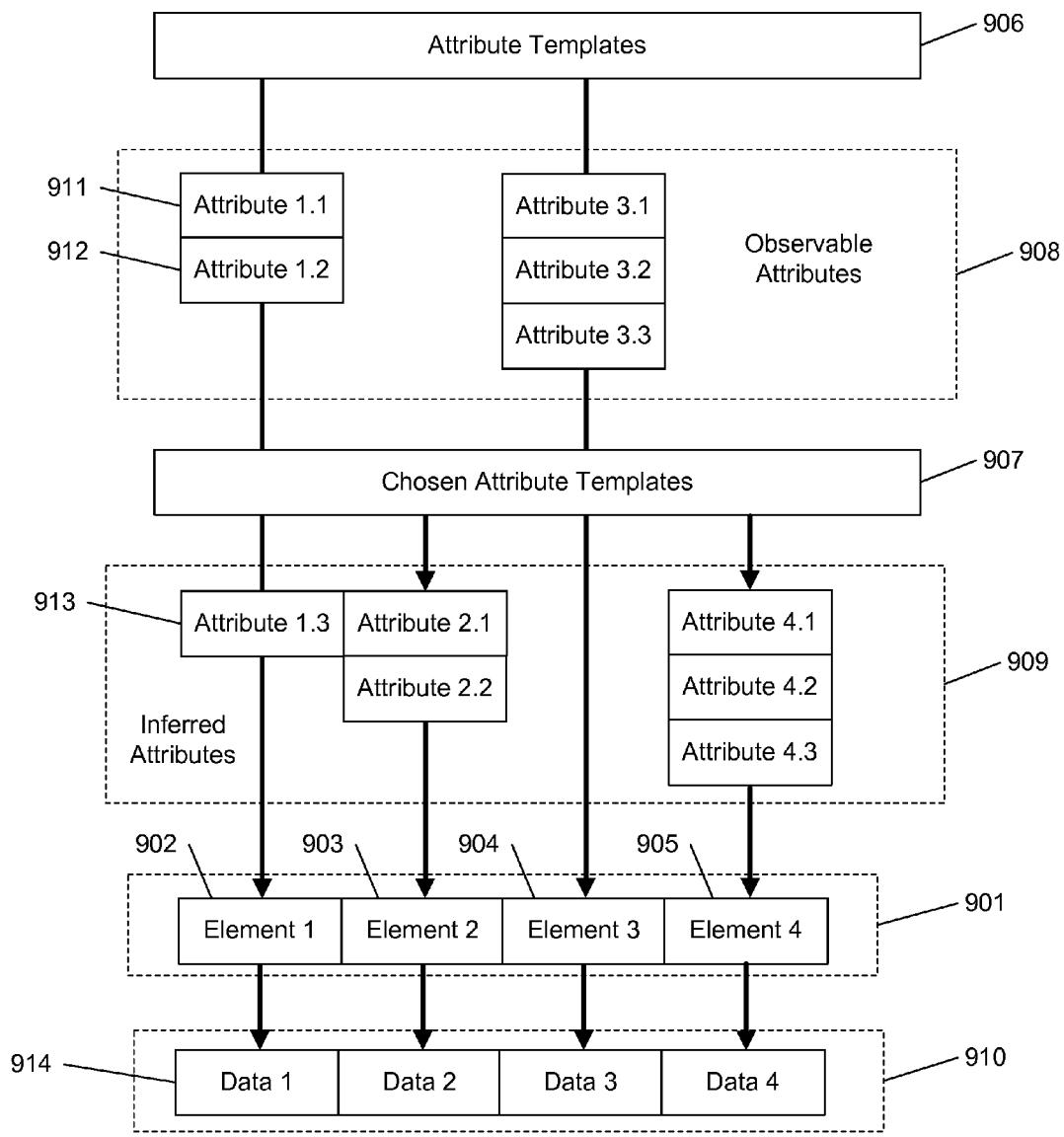
FIG. 9 illustrates an example data flow for application protocol matching, according to an embodiment.

Protocol template matching by a protocol interpreter (e.g., TTC protocol template matching by TTC protocol interpreter 602) will now be described with reference to FIG. 9. Messages processed by the protocol interpreter are made up of a sequence of elements 901 (e.g., RPC verbs, RPC parameters, RPC results, etc.), which are decoded by the interpreter into a data form 910 that is useful for building a model. The transformation from elements 901 to data 910 is controlled by a set of attributes 908 and/or 909, which may be specific to each element. Each message may contain a variable number of elements. For example, FIG. 9 illustrates four elements 902, 903, 904, and 905.

A library 906 of attribute templates may be created for each new protocol session by the protocol interpreter (e.g., TNS protocol interpreter 601 and/or TTC protocol interpreter 602). Library 906 may be created using pre-coded knowledge of the protocol in question, and may be selected as a subset of a larger library of attribute templates, for example, for one or more protocols available for all sessions. For a newly discovered or identified session, the template library 906 may be initially filled with a relatively small set of templates that match broad groups of protocol messages and refer to groups of more specific templates. Multiple templates in the library of attribute templates may match any given message. Thus, in an embodiment, templates may be ordered in the library such that more exact matches are checked by the protocol interpreter before less exact ones. A more exact match will more fully describe a message than a less exact match.

In an embodiment, templates provide characterizations of negotiated data types, RPC options, and client-server architectures. These characterizations may all be used to decode the individual fields of specific RPCs. This can be especially useful when the protocol is not fully specified or secret, or when the initial negotiation for a session cannot be observed. Among other things, template matching can be used to determine which side of a connection (e.g., TCP connection) is the client and which side of the connection is the server, when the start of a communication cannot be observed.

Each template in library 906 contains a list of one or more attributes that may be applied to elements of a message (e.g., an RPC request or response message). For example, a template that matches example message 901 would apply to the elements 902, 903, 904, and 905 of message 901. The matching template can be used to decode message 901 into data 910, which is usable by model generator 604. Each template in library 906 may also contain one or more references to additional templates or a reference to a list of additional templates.

In an embodiment, a template may comprise a set of dynamic runtime classes (e.g., written in C++ code). The templates or "marshallers" are configured to pull specific patterns of data out of the stream and compose valid data. One example is a string template, which is configured to recognize a string represented by a one-byte length field followed by one or more data blocks in which the last data block has a zero-byte length field. Such a template can be tested by attempting to de-marshal a string using the template. For example, if, while a reading a string, the interpreter ends up attempting to read past the end of the available data in the bundle, the template has failed to match. However, it should be understood that this is simply one illustrative example. Other templates may fail to match for simpler reasons. For example, if a high bit is never expected to be set in a specific byte location in a numeric format, it may be determined that a template configured to detect a number in the numeric format has failed to match if a high bit is detected in the specific byte location.

One or more observable attributes 908 (e.g., RPC field types and common markers) may be determined by direct examination of the elements. Template(s) 907 may be chosen by matching one or more of their attributes to observable attributes 908. In other words observable attributes 908 may be compared to the attributes of one or more templates in library 906 to identify the best matching template(s) 907 from library 906. Once matching template(s) 907 have been identified based on attributes observed from elements 902, other attributes 909 may be inferred using template(s) 907.

Figure 10:
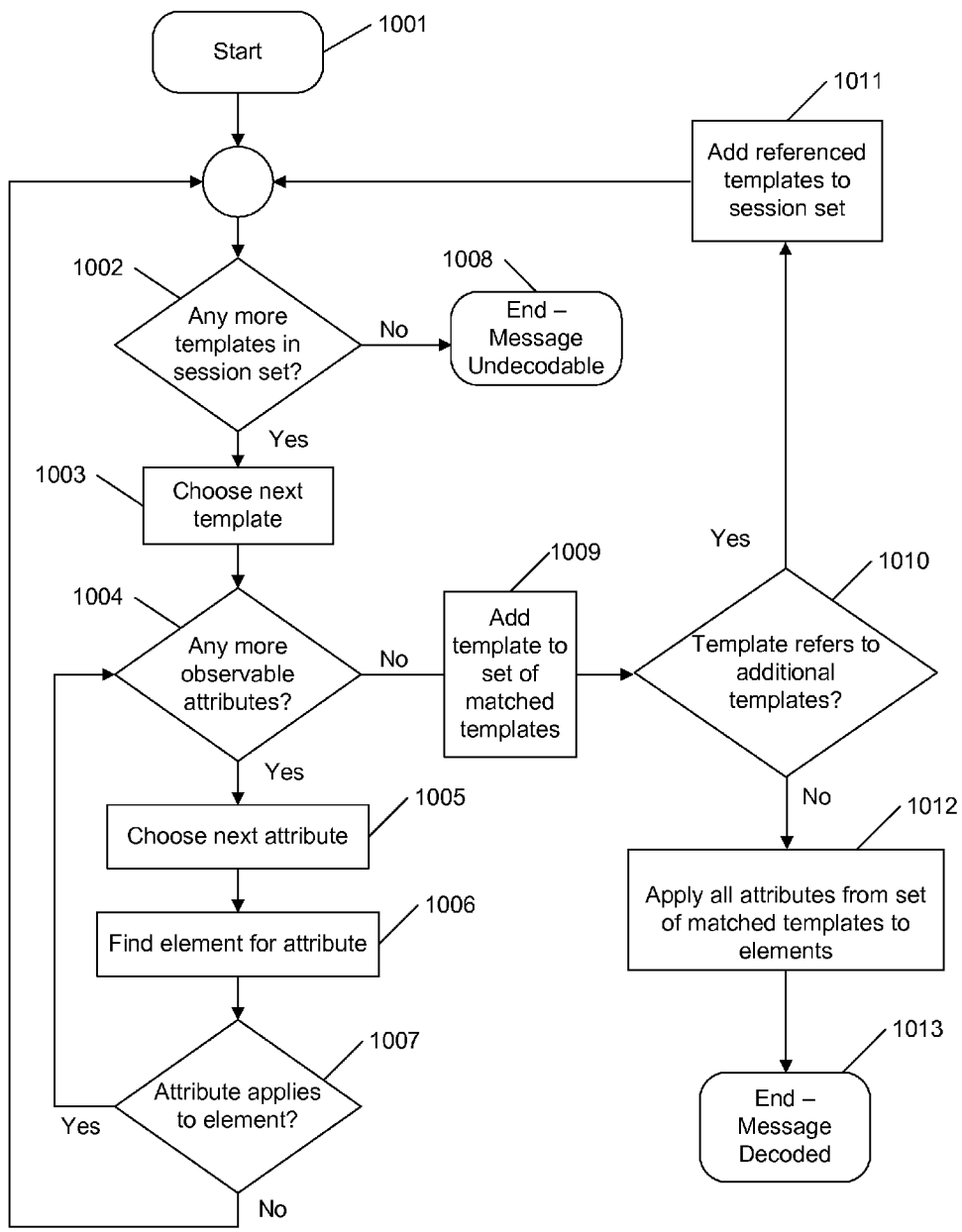
FIG. 10 illustrates a process which may be used by an application protocol interpreter to select attribute templates for decoding an application protocol message, according to an embodiment.

FIG. 10 illustrates an embodiment of a process that may be used by a protocol interpreter (e.g., TNS protocol interpreter 601 and/or TTC protocol interpreter 602) to find matching template(s) 907 from template library 906, and decode a message 901 into a set of useful data 910. At the start 1001 of processing message 901, all templates in library 906 are in the set of templates to be considered. The protocol interpreter iterates through the templates in library 906 and removes non-matching templates from further consideration. Accordingly, in step 1002, it is determined whether any templates remain for consideration. If so, a previously unconsidered template is selected in step 1003.

Each template comprises a set of observable attributes. Observable attributes may be those attributes which are apparent or determinable from message 901 (e.g., from elements 902) or already known about message 901. As each new template is selected for consideration in step 1003, each attribute of that template may be placed in the set of attributes to be checked or observed against message 901. These attributes may comprise inferred attributes, i.e., attributes which may not have been determinable from message 901 or what was previously known about message 901 without having first identified the template comprising the inferred attributes. In step 1004, it is determined whether any attributes remain to be checked. If so, an unchecked attribute is selected in step 1005.

The template indicates to which element of the message each attribute within the template applies. In step 1006, the start of the element, to which the attribute selected in step 1005 applies, is located in message 901. The start of the element may be located by using previously validated observable or inferred attributes from the chosen template. For example, the size of a previous element may be an inferred or observed attribute, and this size may be used to locate the next element in the message.

In step 1007, the selected attribute (e.g., attribute 911) is checked against the located element (e.g., element 902). If this check is successful (e.g., the located element satisfies or corresponds to the selected attribute), the next observable attribute in the selected template is selected and checked. The process of steps 1004, 1005, 1006, and 1007 may repeat until all observable attributes have been checked.

If, in step 1007, an attribute fails to check against an element of message 901, the process may return to step 1002. This process may repeat until all templates in the session's library 906 have been checked, and/or until it is otherwise determined that no more templates must be checked. A check may be unsuccessful, for instance, if the element is not present (e.g., due to packet loss, or due to the template not being an appropriate match for message 901) or if the element does not fit the form of the attribute (e.g., a data type or value range). Furthermore, if no library template is found that successfully checks against message 901, message 901 may be marked as completely undecodable in step 1008. On the other hand, if all observable and/or inferred attributes in a template successfully check against message 901, the template is added to a set of matched templates, or the attributes of the template are added to a set of attributes, in step 1009.

If a template is chosen for the set of matched templates in step 1009 based on matched attributes, it is determined in step 1010 whether the chosen template contains an inferred attribute that references an additional set of one or more templates. For example, this additional set of one or more templates may comprise more specific templates. The additional set of one or more templates is added to the template library 906 for the session in step 1011, and the processing of message 901 is continued in step 1002, based on the supplemented template library 906.

Once all templates in template library 906, including any referenced templates added in step 1011, have been considered with respect to the elements of message 901, message 901 is decoded in step 1012 using one or more matched templates. Message 901 may be decoded in step 1012 into data 910 by applying all of the attributes (e.g., observable attributes 908 and inferred attributes 909) from the chosen template(s) 907 to the elements of message 901 (e.g., elements 902, 903, 904, and 905). In this manner, the pattern of observable attributes 908 found in message 901 results in the identification of a set of inferred attributes 909 by matching the observable attributes 908 to templates in template library 906 that comprise both observable and inferred attributes.

All of these attributes, i.e., both observable attributes 908 and inferred attributes 909, are applied together to message 901 in step 1012 to generate a decoded message in step 1013. For instance, the process in step 1012 for decoding element 902 of message 901 comprises applying the combined observable attributes (e.g., attributes 911 and 912) and inferred attributes (e.g., attributes 913) to element 902 to produce data 914. The other elements of message 901 (i.e., elements 903, 904, and 905) may be decoded in a similar manner.

Each type of attribute may imply or indicate its own form of transformation. As an illustrative, non-limiting example, in the context of Oracle™ TTC protocol interpretation, some examples of applicable attributes include the basic type of data (e.g., string, numeric, date, interval, etc.), the acceptable range of values, a specific value or bit pattern (e.g., an operation code), the dynamic range of a value (e.g., how many bits are required to represent the full range of the value), how many padding bits may be included in a message and their possible values and locations, the encoding of a value (e.g., endianness, character set, bit width, etc.), and/or the internal structure of a value (e.g., simple array of characters with a single length, groups of characters with a length field between each one, etc.).

Some elements of a message may contain bulk data that is not of interest. Thus, in an embodiment, the transformation from element to data (e.g., from element 902 to data 914) in step 1012 may involve eliding or omitting some or all of the actual data, leaving only a description of the data (e.g., the chosen attributes) for use in building a model. The bundling mechanism (described in more detail elsewhere herein) ensures that the high-level message boundaries are discernable, even if part of a message is skipped or omitted in this fashion.

In an embodiment, template library 906, which is used to decode a message, persists on a per-session basis. This allows earlier messages in the session to inform the decoding of later messages in a session. This feature may be particularly critical, for instance, in decoding messages in a session in which the initial connection setup messages are missing.

Figure 6:
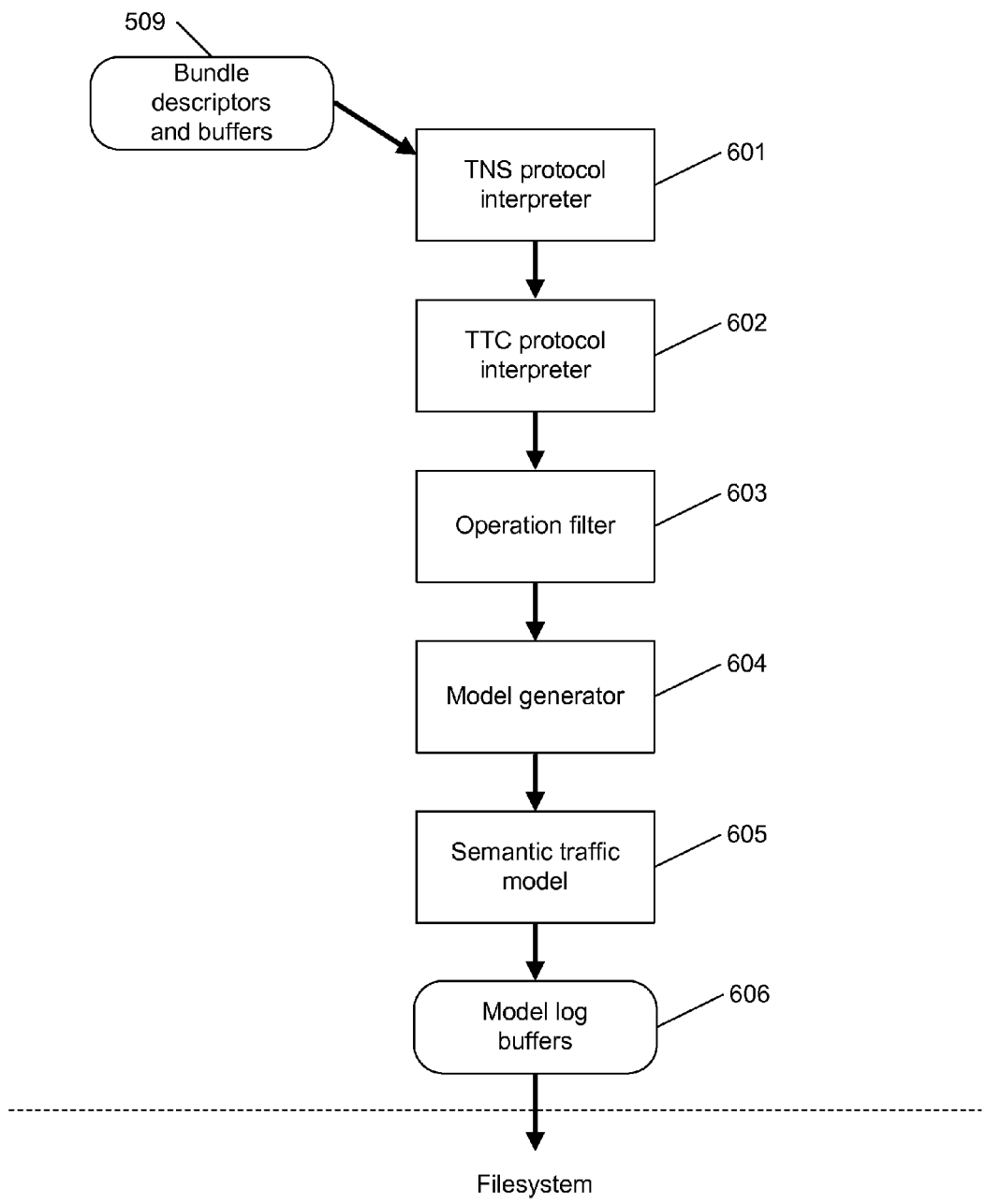
FIG. 6 illustrates example application-level analysis of captured traffic resulting in the generation of a semantic operation model, according to an embodiment.

While the embodiment illustrated in FIG. 6 uses a TNS protocol interpreter 601 and TTC protocol interpreter 602, it should be understood that different interpreters (e.g., for protocols other than TNS and/or TTC) may be used in addition to or instead of the illustrated interpreters and/or a different number of interpreters may be used (e.g., one, two, three, four, etc.), depending on the particular protocol(s) being interpreted.

In an embodiment, the data extracted from TNS protocol interpreter 601 and/or TTC protocol interpreter 602 or, in other contexts, from one or more other interpreters may be passed to an operation filter 603. Operation filter 603 may use application-level semantic data to filter operations that are not of interest. Operations of interest or operations not of interest may be defined or configured by a user. As an illustrative example, the application-level semantic data may include a service name for a database. For instance, two database instances named CRMPROD and CRMDEV may be present on or otherwise available from the same server and use the same TCP port (e.g., port 1521) for RPC traffic. A user may specify that only operations involving CRMPROD are of interest or that the operations involving CRMDEV are not of interest. In either case, operation filter 603 may filter out operations involving CRMDEV from consideration prior to analysis by model generator 604.

At any of the interpreter or filter stages leading up to model generator 604 (e.g., stages 601, 602, and/or 603), processing of a bundle or group(s) of bundles in a session may be deferred, leaving the bundle(s) queued until a new bundle or event is received for the session. This mechanism may be used when information from subsequent bundles may be needed by any of the stages or modules to interpret earlier bundles. For instance, TTC protocol interpreter 602 may use this queuing mechanism to defer processing of undecodable messages in a session until its template library is more refined or developed. In addition, model generator 604 may use this queuing mechanism to retain bundles while attempting to determine which side of a connection is the server and which side of the connection is the client.

Semantic Traffic Model

Referring again to FIG. 6, model generator 604 uses the stream of data and events generated by one or more protocol interpreters (e.g., TNS protocol interpreter 601 and TTC protocol interpreter 602)—and, in an embodiment, filtered by operation filter 603—to build an abstracted semantic traffic model 605 of the operations taking place between network agent 102 and network agent 103. Model 605 may comprise a sequence of verbs and backing data that pertains to a single session (e.g., database session). Model 605 maintains a collection of states for each session and transaction, and describes the sequence of operations applied to that state.

Additional models, including multiple layers of models, may be built from semantic traffic model 605, for example, by detector 108. The details of these higher-level models may be specific to the analysis engine built to use the data of model 605, and may vary based on the goals of the application which will utilize model 605. In other words, different users may build different higher-level models depending on the task at hand. For example, for a security application, a higher-level model may comprise structural and parametric data that describe the normal behavior of an application and expose outlying operations that may represent attacks. As another example, for a performance application, the higher-level model may comprise data describing the timing and size of verbs and their parameters. As a further example, a database firewall may build a higher-level model describing SQL statements and execution semantics surrounding them. A web application firewall (WAF) or WAF-like system may build a higher-level model from model 605 that shows Uniform Resource Identifiers (URIs) and POST parameters.

Model 605 may be built in main memory 205 and/or cache memory 206, and written by file system driver 310 and storage controller driver 311 (e.g., via memory controller 210, bus controller 203, and storage controller 207) to persistent storage device 209. Specifically, in an embodiment, the data of model 605 (e.g., events and metadata) may be queued to model log buffers 606, which may be written to persistent storage device 209.

The data of model 605, queued in model log buffers 606, may comprise a feed that is inputted into one side of an API to be used by the specific higher-level application (e.g., detector 108) providing the API to, for example, construct higher-level models. For instance, for a security application, RPCs being used in monitored sessions and the parameters used in the RPCs, and/or SQL operations being used and the rows and columns being modified by the SQL operations, may be provided from model 605 via model log buffers 606 to the security application via an API defined by the security application. For a performance application, the types of operations being used in monitored sessions may be provided from model 605 via model log buffers 606 to the performance application via an API defined by the performance application. Alternatively, it should be understood that the capture-and-analysis modules 304 may define the API, and one or more applications (e.g., detector 108 which may comprise security application(s), performance application(s), and/or other types of applications) may access the data of model 605 (e.g., stored in model log buffers 606) via the API defined by capture-and-analysis modules 304.

Variations

The disclosed systems and methods may be applied to any application-level protocol that is session synchronous. Such protocols include, without limitation, database client-server protocols used by Oracle™, Microsoft™ SQL, Sybase™ IBM™ DB2, PostgreSQL, MySQL, MongoDB, and other databases. Such protocols also include non-database server protocols, such as HTTP, HTTPS, Network File System (NFS), Apple Filing Protocol (AFP), Server Message Block (SMB), Domain Name System (DNS), Simple Mail Transfer Protocol (SMTP), Internet Message Access Protocol (IMAP), Post Office Protocol (POP), and custom or proprietary application protocols. In addition, the application protocols may be carried over transport mechanisms other than TCP over IP version 4 (IPv4), including, without limitation, User Datagram Protocol (UDP) over IPv4, UDP over IP version 6 (IPv6), TCP over IPv6, Remote Desktop Protocol (RDP) over IPv4, Internetwork Packet Exchange/Sequenced Packet Exchange (IPX/SPX), Internet Control Message Protocol (ICMP) over IPv4, and ICMP over IPv6. The protocols may be carried in any combination over Layer 2 bridges, Network Address Translation (NAT) devices, Virtual Private Network (VPN) tunnels, VLAN technologies, and in-memory inter-process communication (IPC) arrangements on Non-Uniform Memory Access (NUMA) and Uniform Memory Access (UMA) architectures.

The disclosed systems and methods may also be applied to any packet-based or stream-based physical layers, including arbitrary combinations of such layers within the same system. These include physical transports over any supported media, including, without limitation, Fiber Distributed Data Interface (FDDI), Token Ring, 100-megabit Ethernet, 10-megabit Ethernet over coaxial cables, 10-gigabit Ethernet, and Digital Signal 1 (DS1)/Digital Signal 3 (DS3) signaling.

The disclosed systems and methods may utilize any capture mechanism that can make copies of the traffic between network agents, and provide these copies to the disclosed capture-and-analysis device 107 or modules 304. Such capture mechanisms include, without limitation, electrical-level taps, MII proxy taps, a NAT device which routes traffic between network agents and transparently captures the routed traffic, a virtual SPAN or mirror facility that may be part of a Virtual Machine (VM) manager or hypervisor, a TCP or IPC proxy running on any of the involved network agents, and playback of previously captured traffic (e.g., log) from a storage device.

The disclosed systems and methods are not limited to analyzing traffic and building models for a single pair of network agents. Rather, the systems and methods are able to simultaneously monitor many sessions between many pairs of network agents. Furthermore, traffic may be captured simultaneously from a plurality of capture mechanisms in real time or from a play-back. The systems and methods may differentiate between network agents based on transport addresses, as well as other attributes, such as MAC addresses, IP addresses, TCP port numbers, VLAN tags, application-layer-specific identifiers (e.g., service name, SID for Oracle™ protocols, etc.), and/or physical ingress port tags.

It should be understood that the capture-and-analysis device 107 and/or mirror tap may be implemented entirely in software executing in a VM environment. The components of the system—including, without limitation, the capture devices or mechanisms—may run in a distributed fashion on a plurality of virtual or physical appliances and/or operating system processes or drivers. Furthermore, the systems and methods may be implemented on any operating system that supports basic networking and file system capabilities. Alternatively, the systems and methods may be implemented on a physical or virtual device without an operating system (e.g., incorporating required hardware drivers into an application, which embodies the systems and methods, itself).

Different hardware architectures may act as the base for the mirror tap or the capture-and-analysis device 107. These architectures include, without limitation, multiple-CPU-core systems and any supported network or storage peripherals and controllers which support the performance requirements of the system. Any stored program or CPU architecture (e.g., Harvard CPU architecture) may support the disclosed systems and methods.

The reassembly and protocol decoding or interpretation systems and methods described herein may be implemented with different layering than described. For example, the Ethernet, VLAN, IP, and/or TCP reassembly modules may be a single module or entity, and may not support items such as IP fragmentation or VLAN header parsing. The reassembler may use control flags (e.g., ACK, "finish" (FIN), "reset" (RST), etc.) to help determine message boundaries and other exceptional conditions.

Semantic model 605 may be stored on persistent storage on differing storage architectures. Such storage architectures include, without limitation, network file systems, Storage Area Network (SAN) storage, Redundant Array of Independent Disks (RAID) storage, and/or flash memory. Alternatively, model 605 may not be stored in persistent storage at all. Rather, model 605 may be consumed by the ultimate, destination application (e.g., via an API) and discarded.

It should be understood that the destination application of semantic model 605 may use model 605 of traffic to perform other tasks than just those tasks discussed elsewhere herein. Such tasks may include, without limitation, informing a block proxy when to hold and when to release traffic flowing through the capture-and-analysis device 107 so that it may act similarly to an Intrusion Prevention System (IPS), and acting as an application-level proxy and modifying or locally satisfying operations for performance or security purposes (e.g., to implement a database accelerator).

The disclosed systems and methods may handle extreme conditions. Such conditions may include, without limitation, a perfect plurality of traffic copies received due to the utilized capture architecture, a perfect loss of traffic in one direction between a pair of network agents, and new versions of application protocols that are completely unspecified.

In an embodiment, there may be channels of communication which push data, notifications, indications, or other information "backwards" down the analysis chain. Such channels may include, without limitation, notification from the TTC layer to the TNS layer regarding message boundaries or asynchronous signal notifications, and/or messages from TNS protocol interpreter 601 to bundler 508 and/or reassemblers 507 and/or 506 to eliminate the need for a timeout to determine the end of a message (e.g., a message to bundler 508 or reassemblers 507 or 506 comprising an indication that the end of the message has been determined). Such channels may be implemented to allow modules (e.g., interpreters, filters, etc.), further along the analysis chain, to "peek" at the data and assist modules, earlier in the analysis chain. For example, this assistance, provided by later modules to earlier modules in the analysis chain, may comprise the determination of message boundaries.

In an embodiment, during analysis, bundler 508 and/or one or both of reassemblers 506 and 507 may elide blocks of data that are of no use to the application layers. The elided data may be significant in some instances, and may include, without limitation, bulk row data and bind parameters. For example, all data not required for an application at hand may be elided or redacted. The data to be elided may be predetermined (e.g., by user-defined parameters stored in a configuration file). For instance, for a database firewall that is not processing the contents of return row data, the application may elide result row payloads and/or all parameter data.

In an embodiment, bundler 508 and/or one or both of reassemblers 506 and 507 may implement a streaming protocol such that data is delivered to the protocol interpreters without the need to buffer the data or completely buffer the data.

Attributes for protocol message elements, such as TTC protocol message elements, may be inferred directly from clues which are intrinsic to the message or from other clues. These other clues may include, without limitation, known architectures and/or version numbers of the network agents involved in the interaction. For example, these architectures and/or version numbers may be known via configuration or caching of data from a previous message or session.

In embodiments, the search of attribute elements, such as TTC attribute elements, may be elided for a subset of one or more elements. For instance, in an embodiment, if clues provided from an earlier part of the connection establishment protocol indicate that certain templates are not needed, they may be excluded from consideration for performance reasons. As an illustrative example, certain RPC structures may never be used after a given version of an Oracle™ client library. Thus, if the connection setup determines that a newer library version is in use, the interpreters can refrain from attempting to match any templates that solely support older library versions. Additionally, the results of a search for attribute elements may be cached to improve performance.

Generation of the per-session template library 906 may be informed by the results of related sessions. For example, if a template library is selected for a first connection from client A to server B, this previously selected library may be reused as a starting point for a second and subsequent connection from client A to server B, since there may be a good chance that the second connection is from the same application as the first connection. Furthermore, protocol attribute templates may be excluded or included in library 906 based on attributes outside of the immediate protocol messages, such as TNS protocol headers, configuration inputs (e.g., manually defined by a user), IP header fields, rows or bind payload data, TCP header fields, transport layer header fields, etc.

In an embodiment, additional or alternative heuristic methods, than those described elsewhere herein, may be used to determine at least some of the attributes of the data elements for a given message and/or a set of templates that are in the scope of a particular session. For example, information acquired from a session setup negotiation may be used to directly determine one or more attributes. For instance, a "book" of templates for given server version numbers or client library versions and server types may be used to provide a starting point for the template library search. The time to search all possible combinations of templates can be significant. Thus, reducing the search space can be valuable, for example, in terms of improving performance. In addition, the disclosed bundling mechanism may be generalized and used for other purposes than those described elsewhere herein. For example, the bundling mechanism may be used to determine semantics of TNS marker messages, determine performance-related statistics in the model builder, decode row data, characterize row data, etc.

Example Processing Device

Figure 11:
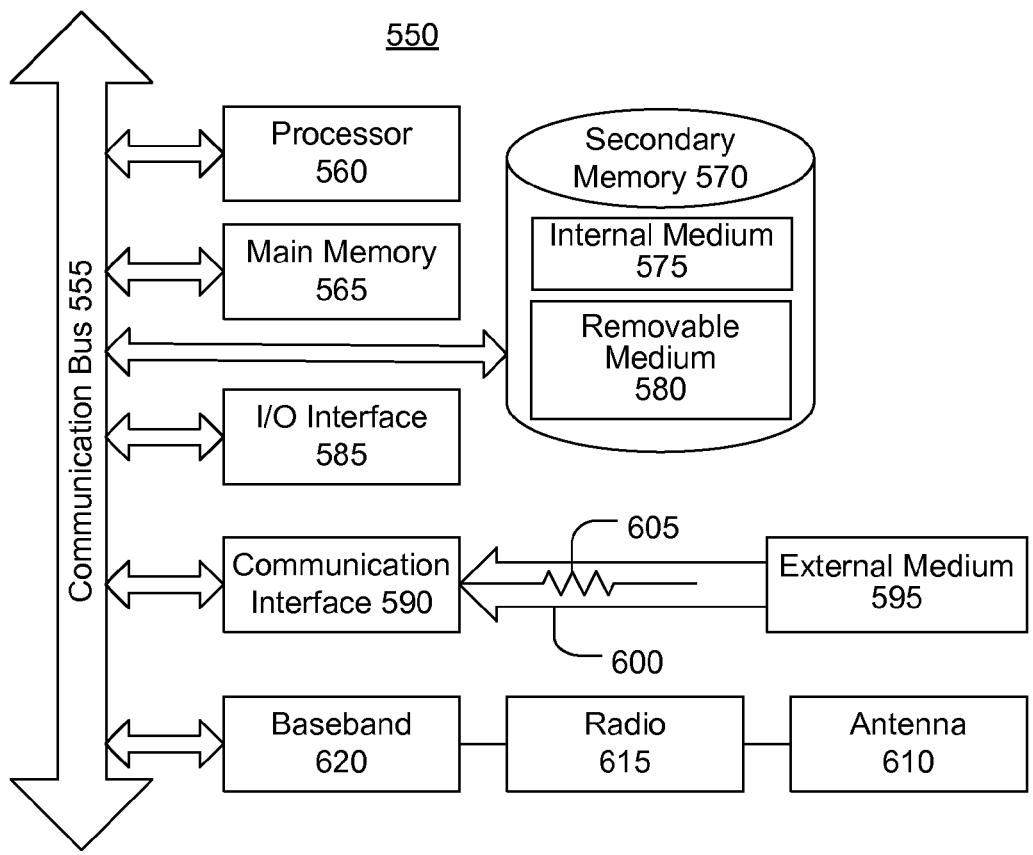
FIG. 11 illustrates a processing system on which one or more of the processes described herein may be executed, according to an embodiment.

FIG. 11 is a block diagram illustrating an example wired or wireless system 550 that may be used in connection with various embodiments described herein. For example the system 550 may be used as or in conjunction with one or more of the mechanisms or processes described above, and may represent components of capture-and-analysis device(s) 107, network agents 102 and/or 103, network switch 101, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for generating a semantic description of operations between network agents, the method comprising, using at least one hardware processor:
   capturing packet-level traffic between a first network agent and a second network agent;
   bundling the packet-level traffic into one or more messages, wherein each of the one or more messages comprises a plurality of elements;
   for each of the one or more messages,
      matching one or more of the one or more elements of the message to one or more attributes, wherein matching one or more of the one or more elements of the message to the one or more attributes comprises, for each template in a set of one or more templates,
         selecting the template, wherein the template comprises a plurality of attributes,
         comparing one or more of the one or more attributes of the template to one or more of the one or more elements of the message,
         determining whether the template matches the message based on the comparison, and,
         if it is determined that the template matches the message, locating one or more unmatched ones of the plurality of elements of the message using one or more inferred ones of the plurality of attributes of the template, and
      decoding the message into message data based on the matched one or more attributes; and
   generating a semantic description of operations between the first network agent and the second network agent based on the message data.

2. The method of claim 1, wherein capturing packet-level traffic between a first network agent and a second network agent comprises receiving copies of packets from a switch positioned on a communicative path between the first network agent and the second network agent.

3. The method of claim 2, wherein the switch is a virtual switch.

4. The method of claim 1, wherein capturing packet-level traffic between a first network agent and a second network agent comprises receiving copies of packets from a network tap positioned on a communicative path between the first network agent and the second network agent.

5. The method of claim 4, wherein the network tap is a virtual network tap.

6. The method of claim 1, wherein bundling the packet-level traffic into one or more messages comprises, iteratively, for each of one more sessions:
   receiving a packet transmitted between the first network agent and the second network agent;
   determining whether a boundary condition has occurred, wherein the boundary condition indicates an end of a message;
   if it is determined that the boundary condition has not occurred, queuing the received packet in memory; and,
   if it is determined that the boundary condition has occurred, bundling one or more packets queued in the memory into a message.

7. The method of claim 6, wherein determining whether a boundary condition has occurred comprises one or more of:
   detecting control information indicating an end of a message;
   detecting a change in direction of communication between the first network agent and the second network agent based on the received packet; and
   detecting that a timeout has occurred since reception of a packet.

8. The method of claim 1, further comprising selecting the set of one or more templates from a plurality of templates.

9. The method of claim 8, wherein the set of one or more templates is selected based on startup information for a connection between the first network agent and the second network agent.

10. The method of claim 8, wherein the set of one or more templates is selected based on a stored set of one or more templates used for a prior connection between the first network agent and the second network agent.

11. The method of claim 1, further comprising, for each of the one or more messages:
   selecting one or more templates that match the message from the set of one or more templates; and
   decoding the message based on the one or more attributes of the selected one or more templates.

12. The method of claim 1, wherein the set of one or more templates comprises one or more templates corresponding to one or more of Transmission Control Protocol (TCP), Internet Protocol (IP), Hypertext Transfer Protocol (HTTP), File Transfer Protocol (FTP), Sequenced Packet Exchange protocol (SPX), Address Resolution Protocol (ARP), Transparent Network Substrate protocol (TNS), Tabular Data Stream protocol (TDS), Symmetric Multiprocessing protocol (SMP), Two Task Common protocol (TTC), Network File System protocol (NFS), Apple Filing Protocol (AFP), Server Message Block protocol (SMB), Domain Name System protocol (DNS), Simple Mail Transfer Protocol (SMTP), Internet Message Access Protocol (IMAP), and Post Office Protocol (POP).

13. The method of claim 1, further comprising discarding at least a portion of one or both of the packet-level traffic and message data, based on one or more filters, prior to generating the semantic description of operations.

14. The method of claim 1, wherein the one or more messages comprise one or more of a request message for a remote procedure call (RPC) and a response message for an RPC, and wherein decoding each of the one or more messages into message data comprises extracting one or more of verbs, parameters, and result payloads for an RPC.

15. The method of claim 1, wherein the capturing is performed by a capture module, wherein the bundling, matching, decoding, and generating is performed by an analysis module, and wherein the method further comprises passing the packet-level traffic from the capture module to the analysis module using at least one application programming interface (API).

16. The method of claim 15, wherein the capture module and analysis module are executed on separate machines.

17. The method of claim 15, wherein the capture module and analysis module are executed on one machine.

18. A method for generating a semantic description of operations between network agents, the method comprising, using at least one hardware processor:
   capturing packet-level traffic between a first network agent and a second network agent;
   bundling the packet-level traffic into one or more messages, wherein each of the one or more messages comprises one or more elements;
   for each of the one or more messages,
      matching one or more of the one or more elements of the message to one or more attributes, wherein matching one or more of the one or more elements of the message to one or more attributes comprises, for each template in a set of one or more templates,
         selecting the template, wherein the template comprises one or more attributes,
         comparing one or more of the one or more attributes of the template to one or more of the one or more elements of the message,
         determining whether the template matches the message based on the comparison, and,
         if it is determined that the template matches the message, determining whether the template comprises one or more references to additional templates, and, if it is determined that the template comprises one or more references to additional templates, adding one or more of the additional templates to the set of one or more templates, and
      decoding the message into message data based on the matched one or more attributes; and
   generating a semantic description of operations between the first network agent and the second network agent based on the message data.

19. A system for generating a semantic description of operations between network agents, the system comprising:
   at least one hardware processor; and
   at least one executable software module that, when executed by the at least one hardware processor,
      captures packet-level traffic between a first network agent and a second network agent,
      bundles the packet-level traffic into one or more messages, wherein each of the one or more messages comprises a plurality of elements,
      for each of the one or more messages,
         matches one or more of the one or more elements of the message to one or more attributes, wherein matching one or more of the one or more elements of the message to the one or more attributes comprises, for each template in a set of one or more templates,
            selecting the template, wherein the template comprises a plurality of attributes,
            comparing one or more of the one or more attributes of the template to one or more of the one or more elements of the message,
            determining whether the template matches the message based on the comparison, and,
            if it is determined that the template matches the message, locating one or more unmatched ones of the plurality of elements of the message using one or more inferred ones of the plurality of attributes of the template, and
         decodes the message into message data based on the matched one or more attributes, and
      generates a semantic description of operations between the first network agent and the second network agent based on the message data.

20. The system of claim 10, wherein capturing packet-level traffic between a first network agent and a second network agent comprises receiving copies of packets from a switch positioned on a communicative path between the first network agent and the second network agent.

21. The system of claim 20, wherein the switch is a virtual switch.

22. The system of claim 19, wherein capturing packet-level traffic between a first network agent and a second network agent comprises receiving copies of packets from a network tap positioned on a communicative path between the first network agent and the second network agent.

23. The system of claim 22, wherein the network tap is a virtual network tap.

24. The system of claim 19, wherein bundling the packet-level traffic into one or more messages comprises, iteratively, for each of one more sessions:
   receiving a packet transmitted between the first network agent and the second network agent;
   determining whether a boundary condition has occurred, wherein the boundary condition indicates an end of a message;
   if it is determined that the boundary condition has not occurred, queuing the received packet in memory; and,
   if it is determined that the boundary condition has occurred, bundling one or more packets queued in the memory into a message.

25. The system of claim 24, wherein determining whether a boundary condition has occurred comprises one or more of:
   detecting control information indicating an end of a message;
   detecting a change in direction of communication between the first network agent and the second network agent based on the received packet; and
   detecting that a timeout has occurred since reception of a packet.

26. The system of claim 19, wherein the at least one executable software module selects the set of one or more templates from a plurality of templates.

27. The system of claim 26, wherein the set of one or more templates is selected based on startup information for a connection between the first network agent and the second network agent.

28. The system of claim 26, wherein the set of one or more templates is selected based on a stored set of one or more templates used for a prior connection between the first network agent and the second network agent.

29. The system of claim 19, wherein the at least one executable software module, for each of the one or more messages:
selects one or more templates that match the message from the set of one or more templates; and
decodes the message based on the one or more attributes of the selected one or more templates.

30. The system of claim 19, wherein the set of one or more templates comprises one or more templates corresponding to one or more of Transmission Control Protocol (TCP), Internet Protocol (IP), Hypertext Transfer Protocol (HTTP), File Transfer Protocol (FTP), Sequenced Packet Exchange protocol (SPX), Address Resolution Protocol (ARP), Transparent Network Substrate protocol (TNS), Tabular Data Stream protocol (TDS), Symmetric Multiprocessing protocol (SMP), Two Task Common protocol (TTC), Network File System protocol (NFS), Apple Filing Protocol (AFP), Server Message Block protocol (SMB), Domain Name System protocol (DNS), Simple Mail Transfer Protocol (SMTP), Internet Message Access Protocol (IMAP), and Post Office Protocol (POP).

31. The system of claim 19, wherein the at least one executable software module discards at least a portion of one or both of the packet-level traffic and message data, based on one or more filters, prior to generating the semantic description of operations.

32. The system of claim 19, wherein the one or more messages comprise one or more of a request message for a remote procedure call (RPC) and a response message for an RPC, and wherein decoding each of the one or more messages into message data comprises extracting one or more of verbs, parameters, and result payloads for an RPC.

33. The system of claim 19, wherein the capturing is performed by a capture module, wherein the bundling, matching, decoding, and generating is performed by an analysis module, and wherein the capture module passes the packet-level traffic to the analysis module using at least one application programming interface (API).

34. The system of claim 33, wherein the system further comprises a first machine and a second machine, and wherein the capture module is hosted on the first machine and the analysis module is hosted on the second machine.

35. The system of claim 33, wherein the system further comprises a single machine that comprises the at least one hardware processor, the capture module, and the analysis module.

36. A system for generating a semantic description of operations between network agents, the system comprising:
at least one hardware processor; and
at least one executable software module that, when executed by the at least one hardware processor,
captures packet-level traffic between a first network agent and a second network agent,
bundles the packet-level traffic into one or more messages, wherein each of the one or more messages comprises one or more elements,
for each of the one or more messages,
matches one or more of the one or more elements of the message to one or more attributes, wherein matching one or more of the one or more elements of the message to one or more attributes comprises, for each template in a set of one or more templates,
selecting the template, wherein the template comprises one or more attributes,
comparing one or more of the one or more attributes of the template to one or more of the one or more elements of the message,
determining whether the template matches the message based on the comparison, and,
if it is determined that the template matches the message, determining whether the template comprises one or more references to additional templates, and, if it is determined that the template comprises one or more references to additional templates, adding one or more of the additional templates to the set of one or more templates, and
decodes the message into message data based on the matched one or more attributes, and
generates a semantic description of operations between the first network agent and the second network agent based on the message data.

* * * * *